United States Patent
Lewis

(10) Patent No.: US 7,865,959 B1
(45) Date of Patent: Jan. 4, 2011

(54) METHOD AND SYSTEM FOR MANAGEMENT OF ACCESS INFORMATION

(75) Inventor: Nina Lewis, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 856 days.

(21) Appl. No.: 10/084,880

(22) Filed: Feb. 27, 2002

Related U.S. Application Data

(60) Provisional application No. 60/272,521, filed on Feb. 28, 2001.

(51) Int. Cl.
  *G06F 21/20* (2006.01)
  *G06F 21/02* (2006.01)

(52) U.S. Cl. .......................................... 726/26; 726/17

(58) Field of Classification Search ...................... 713/1, 713/200, 201, 182, 167, 166, 165; 714/8; 709/225, 229; 707/9
See application file for complete search history.

(56) References Cited

U.S. PATENT DOCUMENTS

| | | | |
|---|---|---|---|
| 5,386,557 A | 1/1995 | Boykin et al. ................... 707/1 |
| 5,450,581 A | 9/1995 | Bergen et al. | |
| 5,497,463 A | 3/1996 | Stein et al. ................... 709/203 |
| 5,579,222 A * | 11/1996 | Bains et al. ................... 717/167 |
| 5,684,951 A | 11/1997 | Goldman et al. | |
| 5,708,812 A | 1/1998 | Van Dyke et al. | |
| 5,768,519 A | 6/1998 | Swift et al. | |
| 5,884,316 A | 3/1999 | Bernstein et al. | |
| 5,899,987 A | 5/1999 | Yarom | |
| 5,983,350 A | 11/1999 | Minear et al. ................... 726/11 |
| 6,092,189 A | 7/2000 | Fisher et al. ................... 713/1 |
| 6,119,230 A | 9/2000 | Carter | |
| 6,126,328 A | 10/2000 | Mallory et al. ............... 717/114 |
| 6,145,086 A | 11/2000 | Bellemore et al. | |
| 6,158,007 A | 12/2000 | Moreh et al. .................... 726/1 |
| 6,158,010 A * | 12/2000 | Moriconi et al. ............ 713/201 |
| 6,178,511 B1 * | 1/2001 | Cohen et al. ................ 713/201 |
| 6,192,130 B1 | 2/2001 | Otway | |
| 6,240,512 B1 | 5/2001 | Fang et al. | |
| 6,243,816 B1 | 6/2001 | Fang et al. | |
| 6,253,216 B1 | 6/2001 | Sutcliffe et al. | |
| 6,260,039 B1 | 7/2001 | Schneck et al. ............... 707/10 |
| 6,275,944 B1 | 8/2001 | Kao et al. | |
| 6,289,462 B1 | 9/2001 | McNabb et al. | |
| 6,321,259 B1 | 11/2001 | Ouellette et al. | |

(Continued)

OTHER PUBLICATIONS

Oracle8 Server Concepts, "Privileges and Roles", Release 8.0, vol. 2, Jun. 1997, pp. 25-1 through 25-15.

(Continued)

*Primary Examiner*—Jeffrey A Gaffin
*Assistant Examiner*—Dipakkumar Gandhi
(74) *Attorney, Agent, or Firm*—Vista IP Law Group, LLP.

(57) ABSTRACT

A method and system for managing access information for users and other entities in a distributed computing system is disclosed. In one approach, information relating to user access is stored in a centralized directory while user roles are locally defined at a networked node. When the user connects to the system, the system looks up the necessary information about the user in the central directory to authorize the user. Thereafter, the user's privileges are determined by the user's assigned roles.

53 Claims, 20 Drawing Sheets

U.S. PATENT DOCUMENTS

| | | | |
|---|---|---|---|
| 6,339,423 | B1 | 1/2002 | Sampson et al. |
| 6,377,950 | B1 | 4/2002 | Peters et al. |
| 6,385,724 | B1 | 5/2002 | Beckman et al. |
| 6,487,552 | B1 | 11/2002 | Lei et al. ............ 707/4 |
| 6,490,591 | B1 | 12/2002 | Denbar et al. |
| 6,507,817 | B1 | 1/2003 | Wolfe et al. |
| 6,535,879 | B1 | 3/2003 | Behera |
| 6,556,995 | B1 | 4/2003 | Child et al. |
| 6,651,168 | B1 | 11/2003 | Kao et al. |
| 6,678,682 | B1 | 1/2004 | Jenkins et al. |
| 6,768,988 | B2 | 7/2004 | Boreham et al. |
| 2001/0023440 | A1* | 9/2001 | Franklin et al. ............ 709/226 |
| 2002/0007346 | A1 | 1/2002 | Qui et al. |
| 2002/0026592 | A1* | 2/2002 | Gavrila et al. ............ 713/201 |
| 2002/0069223 | A1 | 6/2002 | Goodisman et al. |
| 2002/0078004 | A1 | 6/2002 | Ambrosini et al. |
| 2002/0082818 | A1* | 6/2002 | Ferguson et al. ............ 703/22 |
| 2002/0083073 | A1 | 6/2002 | Vaidya et al. |
| 2003/0195888 | A1 | 10/2003 | Croft et al. |

OTHER PUBLICATIONS

Bertino, E. et al. "Controlled Access and Dissemination of XML Documents" *Proceedings of the 2$^{nd}$ International Workshop on Web Information and Data Management* (Nov. 1999) pp. 22-27.

Bertino, E. et al. "On Specifying Security Policies for Web Documents with an XML-Based Language" *Proceedings of the 6$^{th}$ ACM Symposium on Access Control Models and Technologies* (May 2001) pp. 57-65.

Bonczek, R.H. et al. "A Transformational Grammar-Based Query Processor for Access Control in a Planning System" *ACM Transactions on Database Systems (TODS)* (Dec. 1977) 2(4):326-338.

Castano, S. et al. "A New Approach to Security System Development" *Proceedings of the 1994 Workshop on New Security Paradigms* (Aug. 1994) pp. 82-88.

Gladney, H.M. "Access Control for Large Collections" *ACM Transactions on Information Systems (TOIS)* (Apr. 1997) 15(2):154-194.

Hsiao, D.K. "A Software Engineering Experience in the Management, Design and Implementation of a Data Secure System" *Proceedings of the 2$^{nd}$ International Conference on Software Engineering* (Oct. 1976) pp. 532-538.

Myers, A.C. and B. Liskov "Protecting Privacy Using the Decentralized Label Model" *ACM Transactions on Software Engineering and Methodology* (Oct. 2000) 9(4):410-442.

Sandhu, R.S. "The Schematic Protection Model: Its Definition and Analysis for Acyclic Attenuating Schemes" *Journal of the Association of Computing Machinery (JACM)* (Apr. 1988) 35(2):404-432.

Sion, R. et al. "Data Security and Protection: Rights Protection for Relational Data" *Proceedings of the 2003 ACM SIGMOD International Conference on Management of Data* (Jun. 2003) pp. 98-109.

Weede, H.F. and M. Lischka "Role-Based Access Control in Ambient and Remote Space" *Proceedings of the 9$^{th}$ ACM Symposium on Access Control Models and Technologies* (Jun. 2004) pp. 21-30.

How to: "Use ADSI to Set LDAP Directory Attributes", Microsoft 2000 Edition, Sep. 28, 2007, Revision: 3.3.

"Configuring LDAP", The Apache Software Foundation 2003-2009.

\* cited by examiner

METHOD AND SYSTEM FOR MANAGEMENT OF ACCESS INFORMATION

The present application claims the benefit of U.S. Provisional Application No. 60/272,521, filed on Feb. 28, 2001, which is hereby incorporated by reference in its entirety.

The present application is related to the following applications: U.S. application Ser. No. 09/974,085, filed on Oct. 9, 2001, entitled "Method and System for Management of Access Information", U.S. application Ser. No. 10/084,881, filed on Feb. 27, 2002, entitled "Method and System for Implementing Current User Links"; and U.S. application Ser. No. 10/086,103, filed on Feb. 27, 2002, entitled "Method and System for Implementing Shared Schemas for Users in a Distributed Computer System." The above identified applications are hereby incorporated by reference in their entireties, as if fully set forth herein.

BACKGROUND AND SUMMARY

The invention relates to computer systems, and more particularly, to a method and mechanism for managing access information in a distributed computing environment, such as a distributed database environment. Some of the tasks faced by an enterprise in managing user access and privileges include managing information about users, keeping user information current, and securing access to all the information in an enterprise. These tasks have become complex because of the increased use of technology and high user turnover in many enterprises. In addition, these tasks are also made more complex because each user may have multiple accounts and/or passwords on different network nodes. These numerous accounts are often in addition to any other operating systems based accounts possessed by the user. The effort of managing all this user information in numerous user accounts, which often contains duplicative information, leads to increased maintenance costs and decreased efficiencies.

Furthermore, the distributed nature of managing multiple user accounts leads to increased security risks. For example, whenever a user leaves a company or changes jobs, the user's account status and privileges should be changed the same day in order to guard against misuse of that user's accounts and privileges. However, in a large enterprise with numerous user accounts and passwords distributed over multiple databases, an administrator may not be able to make the timely changes required by good security practices.

Requiring a user to maintain multiple accounts on different network nodes may also create increased security risks. For example, if the user must maintain a password for each account, then the user is likely to use the same password for each of the distributed accounts. This creates a security risk since this same password information now exists in multiple account locations and the breach of that password security at one location creates a security problem at all locations, which is particularly troubling if some of the account locations have lower security precautions in place than other locations.

Accordingly, the present invention provides an improved method and system for managing access information for users and other entities in a distributed computing system. In an embodiment of the present invention, information relating to user access (e.g., name, authentication information, and user roles) is stored in a centralized directory. When the user connects to the database, the database looks up the necessary information about the user in the directory. In an embodiment, the present invention addresses the user, administrative, and security challenges described above by centralizing storage and management of user-related information in an LDAP-compliant directory service. When an employee changes jobs in such an environment, the administrator need only modify information in one location—the directory—to make effective changes in multiple databases and systems. This centralization lowers administrative costs and improves enterprise security. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and mechanism for centralized management of access information in a computing system. Specific orderings and combinations of process actions and system components are described herein to illustrate the invention. It will, however, be evident that various modifications and changes may be made without departing from the spirit and scope of the invention. For example, the following explanation of the invention is made with respect to a distributed system comprising database nodes (also referred to as database servers or databases).

However, the inventive concepts disclosed herein may be equally applied to other types of computing nodes. Thus, the specification and drawings are to be regarded in an illustrative rather than restrictive sense.

Overview

Figure 1:
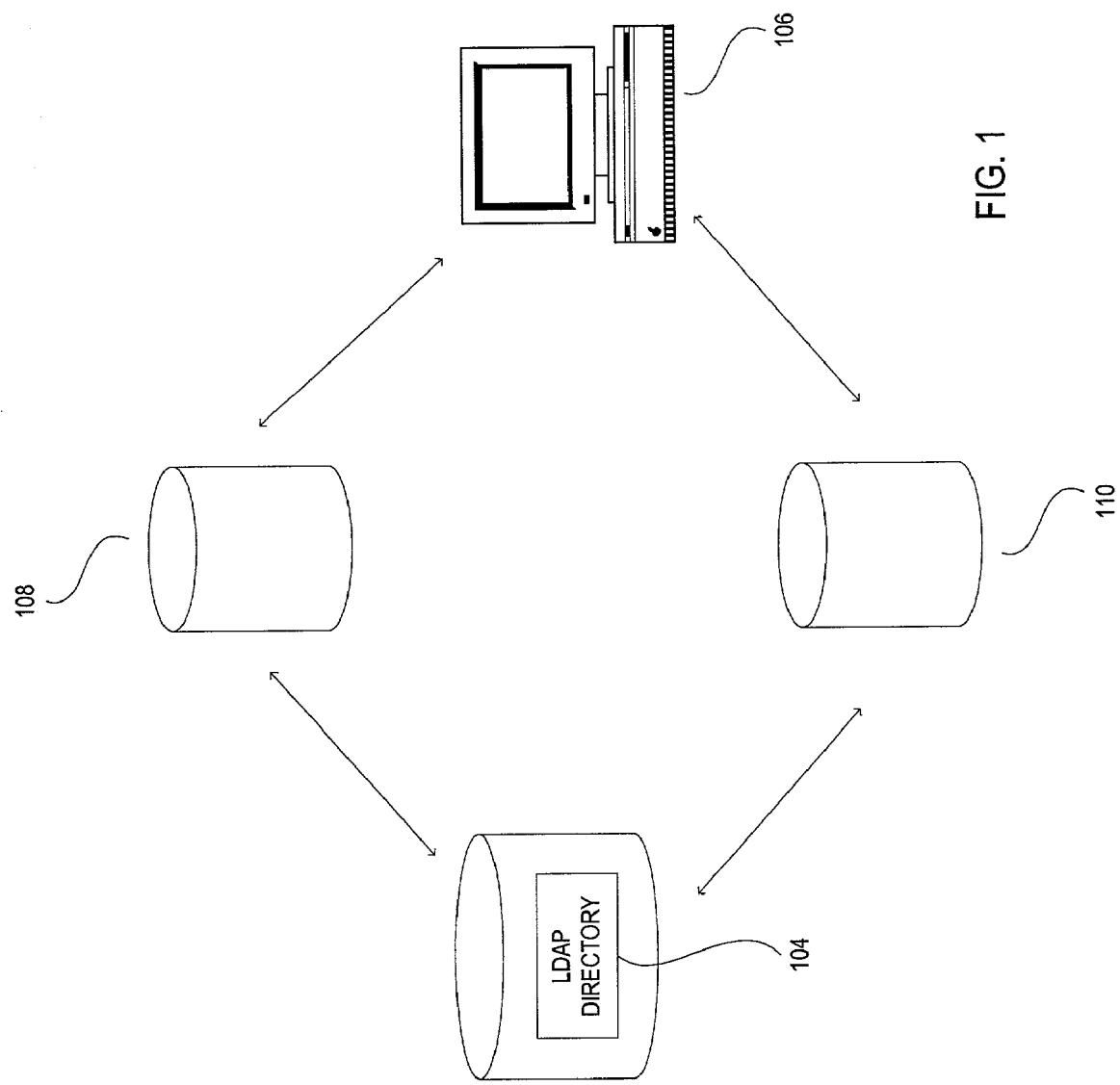
FIG. 1 depicts an architecture for storing user information according to an embodiment of the invention.

FIG. 1 shows a system for managing user and access information according to an embodiment of the invention. User access and privilege information are stored in a centralized directory information system 104, which in an embodiment comprises a LDAP directory. When a user at computer access device 106 seeks to access a first database 108 or a second database 110, "authentication" information is communicated from access device 106 to the respective database for which access is sought. Authentication refers to the process of verifying that a user is who he claims to be. This may be accomplished, for example, by requiring the user to provide a valid password associated with the user's identification or by supplying a digital certificate that validates the user's identity. The centralized directory information system 104 maintains current authentication information for authorized users of the computing system. For example, the current password and/or digital certificate validation data for users are stored at the directory information system 104. The centralized directory information system 104 communicates with each database 108 and 110 to authenticate users that seek to access any of the databases serviced by the centralized directory information system 104. Alternatively, user authentication information is stored for verification at each database 108 or 110 for which access is sought or at the client 106.

The directory information system 104 also maintains "authorization" information for each user. Authorization generally refers to the scope of privileges and roles assigned to a given user. Once a user has been successfully authenticated that user's authorization information is sent to the database for which access is sought. The authorization information determines the scope of access that is granted to the user.

Authorization and/or authentication information for users in the distributed computer system can be centrally stored and maintained in the directory information system 104. Hence, each individual database 108 and 110 is not required to locally maintain user account and access information. However, the present invention permits each local database to customize and define the exact amount, level, and scope of access that a user has in the local database based upon the centrally stored user authorization information. In effect, the present invention provides a method and mechanism for centralized management of user roles, but allows decentralized definitions of those user roles based upon the specific requirements of the local database systems.

Enterprise Users Roles and Domains

Figure 3A:
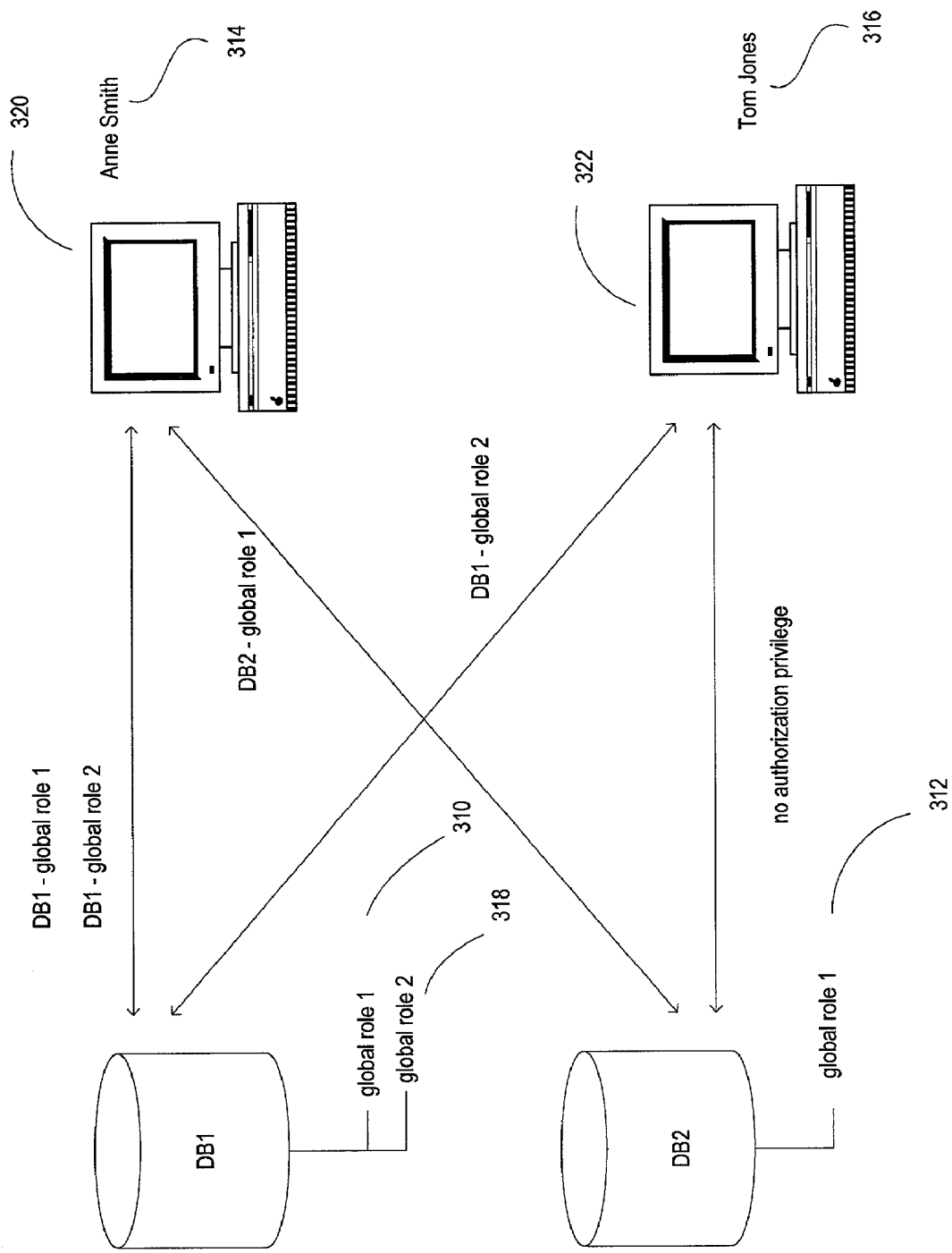
FIG. 3a depicts components of an example distributed system.

According to an embodiment, the present invention manages user access privileges to databases based upon a hierarchy of assigned "roles." To illustrate, FIG. 3a shows an example configuration of a first database DB1 and a second database DB2. Each database can be configured to maintain one or more sets of privileges known as "global roles." A global role is a set of privileges that is locally defined at each database, but which is centrally administered at the central LDAP directory. The first database DB1 has a local definition for two global roles 310 and 318. The second database DB2 has a local definition for a global role 312. A user 314 (Anne Smith") at a first access device 320 and a second user 316 ("Tom Jones) at a second access device 322 seek to access databases DB1 and DB2. Each user is an "enterprise user", which is a user defined and managed in a directory information system. According to an embodiment, each enterprise user has a unique identity across the enterprise.

Figure 3B:
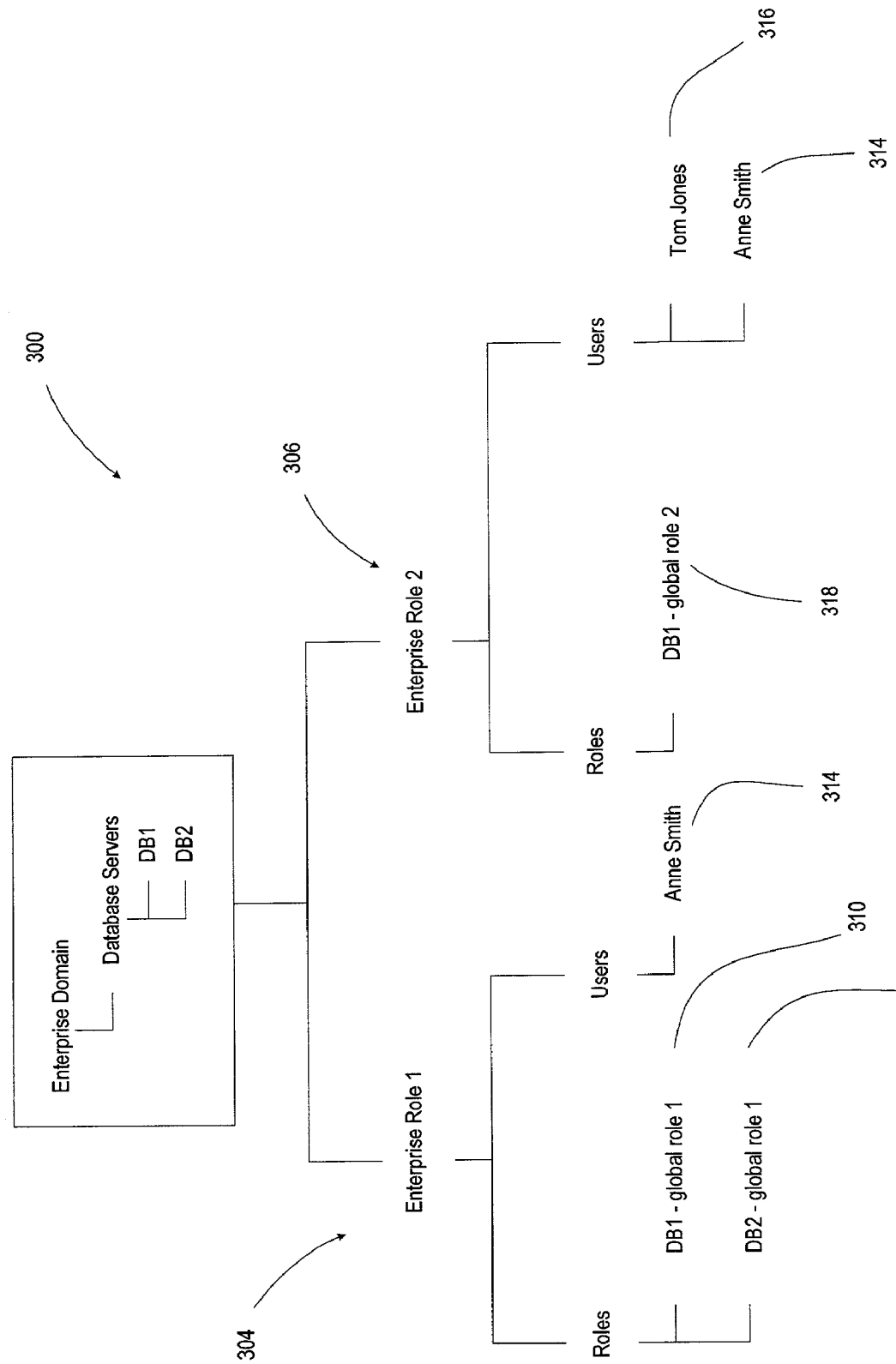
FIG. 3b represents a security hierarchy for the distributed system of FIG. 3a according to an embodiment of the invention.

FIG. 3b depicts an example of an enterprise domain 300 corresponding to the computing system of FIG. 3a according to an embodiment of the invention. An enterprise domain is a grouping of databases and roles that is used to manage user privileges. The enterprise domain 300 includes a list of the databases associated with that domain. Here, enterprise domain 300 identifies databases DB1 and DB2 as being grouped within it. It is at the enterprise domain level that roles are allocated to users to manage enterprise security according to an embodiment of the invention. Enterprise domains may be configured to match logical user or organizational boundaries. For example, the databases for each department of a large company may be grouped as separate enterprise domains.

The enterprise role hierarchy 300 includes a subtree for each "enterprise role" 304 and 306 defined in the enterprise domain. An enterprise role is a collection of global roles and associated users. As noted above, a global role is a set of defined privileges that is specific to a local database node. A user may be associated with an enterprise role, which assigns to that user the privileges defined by all the global roles contained within that enterprise role. Each enterprise role may be associated with multiple users. A user may be associated with multiple enterprise roles.

In the example enterprise domain 300 of FIG. 3b, a first enterprise role 304 includes two global roles 310 and 312. Global role 310 comprises a set of privileges at a first database DB1. Global role 312 comprises a set of privileges at a second database DB2. A first user 314 ("Anne Smith") is associated with enterprise role 304. Each user associated with enterprise role 304 has all of the privileges defined by global roles 310 and 312. Thus, when user Anne Smith 314 accesses database DB1, the privileges granted by global role 310 are given to user 314 based upon the user's association with first enterprise role 304. Similarly, when user Anne Smith 314 accesses database DB2, the privileges granted by global role 312 are given to that user based upon the user's association with first enterprise role 304.

The second enterprise role 306 includes a single global role 318 for a set of privileges granted at database DB1. Users 314 and 316, Anne Smith and Tom Jones respectively, are associated with enterprise role 306. Thus, when either user Anne Smith 314 or Tom Jones 316 accesses database DB1, the privileges granted by global role 318 are given to that user based upon the user's association with enterprise role 306.

Note that neither enterprise role 304 nor enterprise role 306 provides user Tom Jones 316 with any privileges at database DB2. Enterprise role 304 includes a global role 312 for database DB2, but user Tom Jones 316 has not been associated with this enterprise role 304. User Tom Jones 316 is associated with enterprise role 306, but this enterprise role does not include a global role for database DB2. Thus, even if user Tom Jones 316 is authenticated for access to database DB2, this user does not obtain any privileges or roles at that database unless such privileges and roles are locally defined outside of the enterprise roles.

According to an embodiment of the invention, a database obtains a user's global roles when the user logs in. If a user's global roles change, those changes do not take effect until the next time the user logs in. More details regarding the process for logging in is described below.

Centralized Directory Information System

According to an embodiment of the invention, the relationships between users and their associated roles in an enterprise domain structure are maintained as a hierarchy of objects in a directory information system. A directory in a directory information system can be considered an index to organized information. The directory lists objects, e.g., people and organizations, and gives details about each object. In a computerized environment, a directory is a database that stores collections of information about objects. The information in such a directory might represent any resource that require management—for example, employee names, titles, and security credentials, information about e-commerce partners, or about shared network resources such as conference rooms and printers.

A common directory information system is a directory based on the Lightweight Directory Access Protocol ("LDAP"). LDAP is a directory protocol that was developed at the University of Michigan, originally as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain directory information. Further details of the LDAP directory protocol can be located at the LDAP-devoted website maintained by the University of Michigan at http://www.umich.edu/~dirsvcs/ldap/, including the following documents (which are hereby incorporated by reference in their entirety): RFC-1777 Lightweight Directory Access Protocol; RFC-1558 A String Representation of LDAP Search Filters; RFC-1778 The String Representation of Standard Attribute Syntaxes; RFC-1779 A String Representation of Distinguished Names; RFC-1798 Connectionless LDAP; RFC-1823 The LDAP Application Program Interface; and, RFC-1959 An LDAP URL Format.

The present invention is described with reference to LDAP directories. LDAP directory systems are normally organized in a hierarchical structure having entries (i.e., objects) organized in the form of a tree, which is referred to as a directory information tree (EDIT"). The DIT is often organized to reflect political, geographic, or organizational boundaries. In an LDAP directory, each collection of information about an object is called an entry. A unique name or ID (which is commonly called a "distinguished name") identifies each LDAP entry in the DIT. An LDAP entry is a collection of one or more entry attributes. Each entry attribute has a "type" and one or more "values." Each entry belongs to one or more object classes. Entries that are members of the same object class share a common composition of possible entry attribute types.

Databases (and other LDAP clients) refer to entries in the directory information system to determine enterprise user authorization at login. In an embodiment, the enterprise domain is associated with at least two types of objects: enterprise role objects and mapping objects. Enterprise role objects contain information about roles in the computing system. Mapping object contains mapping information between a full or partial distinguished name ("DN") in the directory information system and a user/schema name. Mapping objects are normally created for a particular domain. Mapping objects also reside under server objects, and are created for a particular database.

Figure 2A:
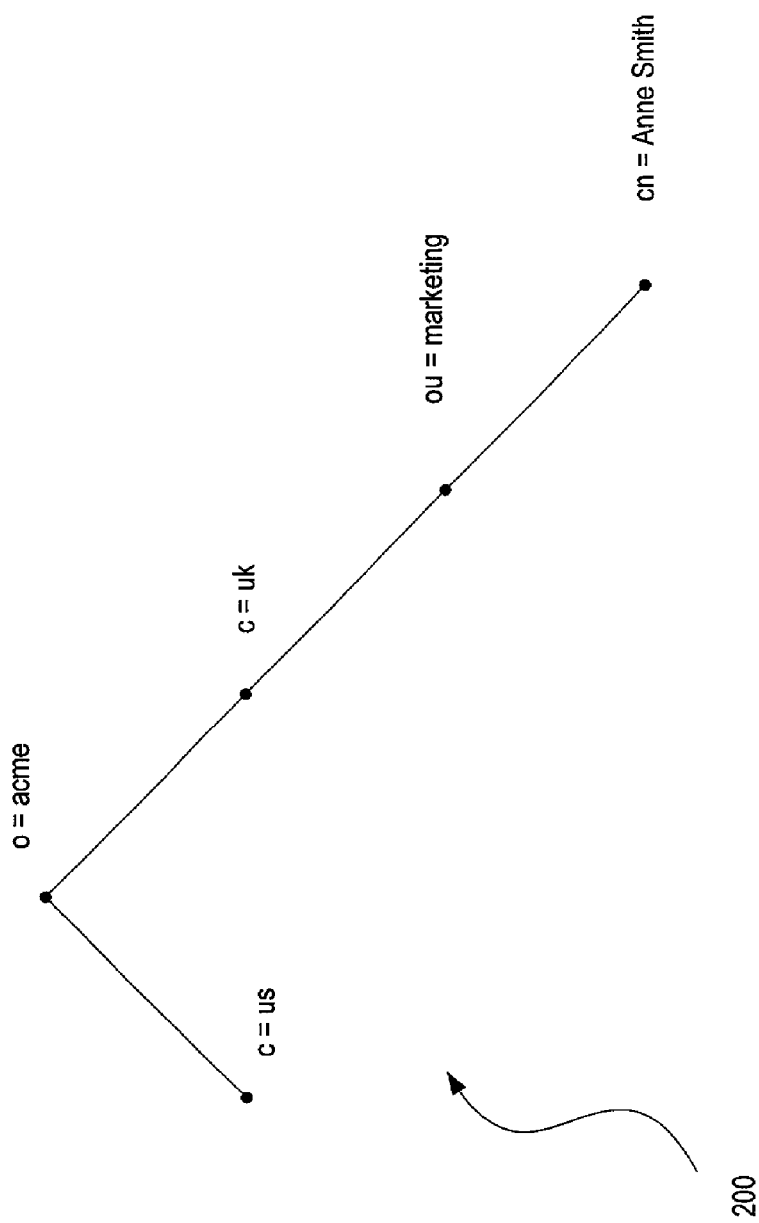
FIG. 2a represents an example directory information tree.

As noted above, each entry in an LDAP directory is uniquely identified by a distinguished name (DN). The distinguished name identifies where the entry resides in the directory's hierarchy. The directory hierarchy can often be represented in a tree structure, referred to as a directory information tree (DIT). An example of a DIT 200 is shown in FIG. 2a. The DIT 200 in FIG. 2a is structured along geographical and organizational lines. The example DIT 200 uses the following notation to define distinguished name components:

o=organization
c=country
ou=organizational unit
cn=common name

In DIT 200, the branch on the right represents the entry for a person "Anne Smith," who works in the organizational unit (ou) "Marketing", in the country (c) of Great Britain (uk), in the organization (o) Acme. The DN for this Anne Smith entry is:

cn=Anne Smith,ou=Marketing,c=uk,o=acme.

Note that the conventional format of a distinguished name for a LDAP directory starts with the least significant component (that naming the entry itself) and proceeds to the most significant component (that just below the root).

In an embodiment of the invention, one or more administrative contexts are created in the directory to store enterprise information. The administrative context is created by an entity having suitable access permissions in the directory on a particular administrative context. For example, the person trying to create a new Context in "c=uk,o=acme" would need suitable permissions on that entry. The administrative context is created directly underneath, so that the root of the administrative context is "cn=AdminContext,c=u,o=acme".

Any number of contexts may be suitably employed in the directory. Examples of contexts used in embodiments of the invention are user-defined contexts and root context. The root context sits at the root of the directory tree. In the preferred embodiment, there exists one root context, but there may be any number of user-defined contexts in a directory. A user-defined Context is created by an entity with access permissions in the directory on a particular administrative context. In an embodiment, the context includes the attribute names that will hold a nickname attribute and the user search base. The default for the Nickname Attribute in one approach is CN and the default for User Search Base is the root of the DIT or the parent of the administrative context.

An enterprise domain object, which may also be referred to as a RDBMS (relational database management system) Enterprise Domain object, is an object class that is employed in embodiments of the invention. In an embodiment, objects in this class maintain the enterprise domain name (RDN) and the list of RDBMS servers participating in the enterprise domain. Note that other types of database management systems may also be employed with the present invention (e.g., object-based databases), and thus the invention is not limited to relational databases. Enterprise domain objects may also track the global users participating in the respective domains. The list of users can have either user names or group names. The list of users defines the global users set. This object class may also include a list of accepted authentication types for databases in the domain, such as password, SSL, and/or ALL.

A server object, which can also be referred to as a RDBMS Server Object, is another object class that is employed in embodiments of the invention to identify database servers in the enterprise domain. Objects in this class may include attributes that identify the server name (RDN), server global name, server certificate, directory password, and a list of trusted users permitted for direct links between servers without authentication. According to an embodiment, the server object exists directly under the cn=AdminContext object, but it may also be located elsewhere. The server object may include other attributes, such as additional attributes for storing information regarding network aliases, server certificates, and listener information.

The enterprise role object is another object usable in the invention, which corresponds to the set of global roles that are assigned to an enterprise role. Enterprise roles may also contain other enterprise roles. This object may also contain the list of users to whom these roles are assigned. According to an embodiment, the enterprise role entries exist under the enterprise domain entry. Enterprise roles contain server global roles and may contain enterprise roles in a recursive manner. The enterprise roles can be assigned to users. The role assignees can be user groups also. The user group is useful for mapping defined group concepts for role assignment. The user's X.500 distinguished name, which is used for authentication using SSL, is an item of information used for role assignment in the enterprise role object. In an alternate embodiment, SSL is not employed and this information is not based in the DN.

An enterprise role comprises server global roles in an embodiment, and may contain enterprise roles in a recursive manner. This object class may include another object class for grouping users, so that users allocated this role will be represented as members of the group. The role assignees can be user groups also. The user group is useful for mapping OS defined group concept for role assignment, for example, the NT user groups. The user entry is preferably not modified for assigning roles. The user's X.500 distinguished name, which is used for authentication using SSL, is an item of information used for role assignment in the enterprise role object in one embodiment. In an embodiment, the enterprise role will contain the following information: (a) Zero or more global roles; (b) Zero or more enterprise roles; and (c) List of users to whom the enterprise role has been assigned.

The User Object is another object class that may be employed in embodiments of the invention. In an embodiment, users who intend to make use of the security framework of the invention are associated with a globally unique name, e.g., X.500 Distinguished Name. In one embodiment, this name is used when roles are assigned to these users. As noted above, the user entry is preferably not modified for assigning roles. Other user information, e.g., unique user information such as a global user ID, may also be employed when assigning roles.

Mapping objects comprise another object class useable in the invention. As described in more detail below, these objects are used for schema assignments, to map enterprise users to local database schemas. The mapping object contains the mapping of an enterprise DN and a native database username. According to an embodiment, the mapping object exists as a child of a server object or of an enterprise domain object. In an embodiment, the mapping object is a group object, where the CN attribute reflects the schema name and the members attribute contains all users who map to that schema. In an alternate embodiment, the mapping object is not a group object, where a native user attribute reflects the schema name and a distinguished name attribute contains the user identification that maps to a schema. An entry level mapping object according to an embodiment is an objectclass that contains a single mapping represented as two attributes: a full DN for an Enterprise User and a native username. A subtree-level mapping object is an objectclass that contains a single mapping represented as two attributes, e.g., a DN that does not necessarily represent an Enterprise User, and a native username. Only users under that DN in the directory tree will be mapped to the specified native user. If the DN itself is a user, then that user is not mapped to the native user. A full DN preferably takes precedence over a partial DN, and a mapping under the server takes precedence over one under that server's enterprise domain.

Other and additional object classes or combinations of object classes may be employed within the scope of the invention. For example, an application context is another object that can be used in the invention that contains a value for an application context attribute. This object may include information such user title, job description, task within this application, etc. The application context entry can exist in the subtree of an enterprise domain. Under the application context container object could be another container object representing an application context namespace, and under that another container representing an application context attribute name. At the bottom of these entries could be entries representing application context values. Each of these value entries will include the list of users who have been allocated this value. One reason to use an application context container is to avoid namespace overlap between context names and enterprise role names. Another example object class is for administration groups, which as explained in more detail below, support access control on entries in the directory. An exemplary approach for managing attribute information is disclosed in co-pending U.S. application Ser. No. 09/974, 085, filed on Oct. 9, 2001, which is hereby incorporated by reference in its entirety.

Figure 2B:
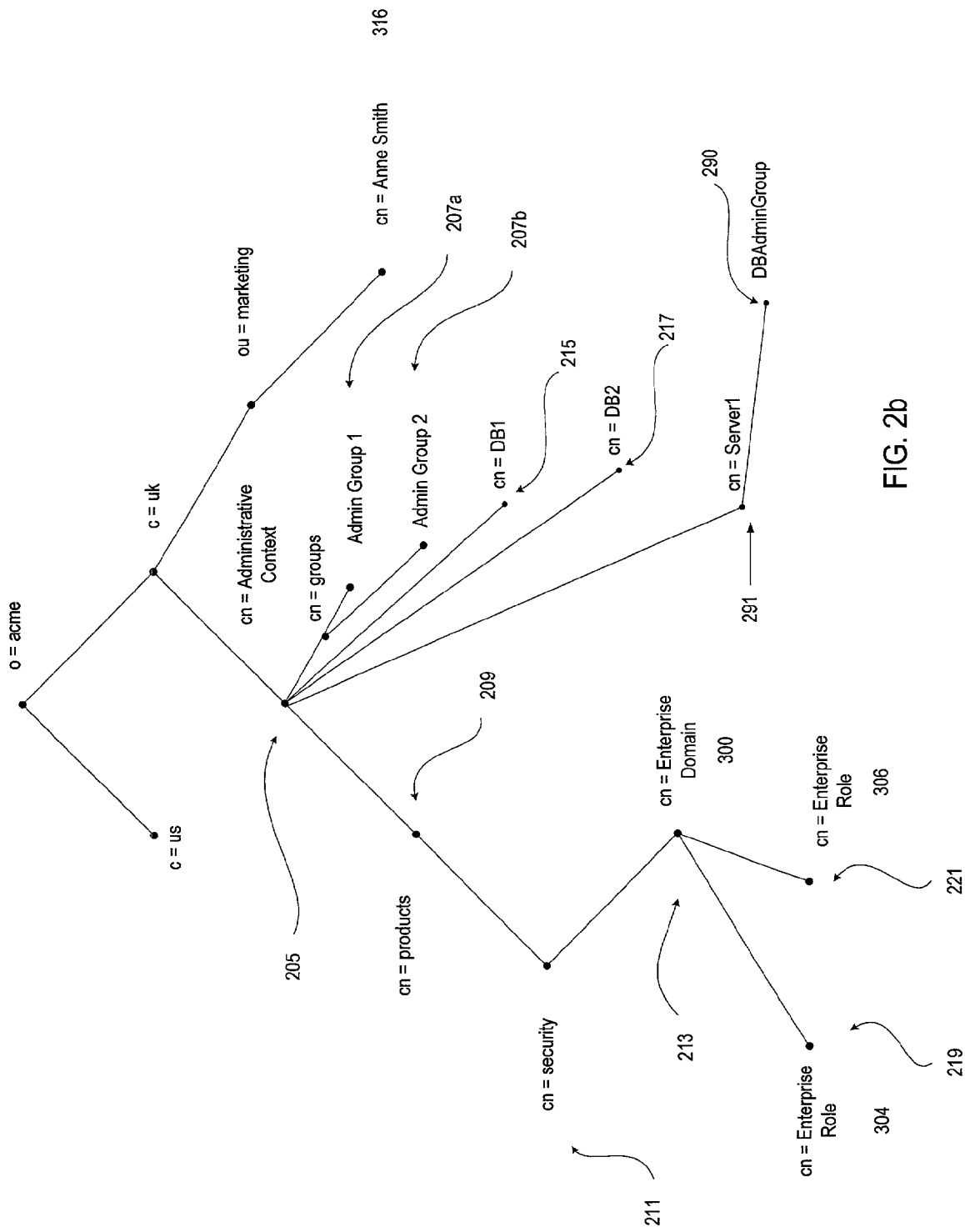
FIG. 2b represents a directory information tree having security management objects according to an embodiment of the invention.

One or more naming contexts can be chosen to contain enterprise information. To illustrate, shown in FIG. 2b are additional administrative entries added to the LDAP DIT 200 of FIG. 2a. An administrative context 205 (cn=Administrative Context) is a created as a special entry in the LDAP directory to contain entries to support directory naming and enterprise user security. Various container objects may exist in the administrative context subtree. For example, a products container object 209 and a security container object 211 may exist in the subtree beneath the administrative context 205.

According to an embodiment, enterprise domain information is represented in the LDAP directory by adding one or more enterprise domain objects 213 in the subtree beneath the security container object 211. For the purposes of illustration, the enterprise domain object 213 in FIG. 2b is shown representing the enterprise domain 300 of FIG. 3b. Therefore, the subtree beneath enterprise domain object 213 includes objects that match the enterprise domain hierarchy shown in FIG. 3b. The enterprise domain object 213 includes an attribute that identifies the databases associated with the domain.

Any enterprise roles associated with enterprise domain 300 would be represented as enterprise role objects in the subtree beneath enterprise domain object 213. Thus, enterprise role object 219 in the subtree beneath enterprise domain object 213 represents enterprise role 304 of FIG. 3b. A first attribute or set of attributes in enterprise role object 219 identifies the global roles associated with enterprise role 304. A second attribute or set of attributes in enterprise role object 219 contains a mapping between enterprise users and enterprise role 304. Similarly, enterprise role object 221 in the subtree beneath enterprise domain object 213 represents enterprise role 306 of FIG. 3b. A first attribute or set of attributes in enterprise role object 221 identifies the global roles associated with enterprise role 306. A second attribute or set of attributes in enterprise role object 221 contains a mapping between enterprise users and enterprise role 306.

Any enterprise domain structure can be mapped into an LDAP directory tree by adding one or more entries corresponding to the enterprise entity being mapped. While the above description of the embodiment shown in FIG. 2b describes example locations for the placement of objects within the administrative context 205, it is noted that other embodiments of the invention may locate any or all of the objects in alternate locations within the LDAP directory.

The subtree under the administrative context 205 can also include other objects representing other entities in a computer system, such as server and network entities. For example, the administrative context may include a database server object. In the example of FIG. 2b, objects 215 and 217 in the subtree beneath administrative context entry 205 identify the databases DB1 and DB2. A database server object contains information about a database server. It can be created during the database installation and can be added later by members of the privileged administrative groups. A database server object is the parent of database level mapping objects that contain mapping information between full or partial DNs and shared schema names, as described in more detail below.

Access to enterprise domain, enterprise role and the RDBMS server object entries should be properly managed for security access reasons. Thus, permission to create, delete or modify enterprise domain and the enterprise role object entries should be granted only to authorized enterprise domain administrators.

Access control lists ("ACLs") are employed in one embodiment to control access to enterprise objects. When administrative operations are attempted within a directory, the directory server checks the enterprise ACLs to ensure that the user has the required permissions to perform those operations. Otherwise, the operation is disallowed. Thus, ACLs in the directory protect directory data from unauthorized operations by directory users. According to an embodiment, ACLs may be assigned to an entire group of administrators. For an LDAP directory, this is accomplished by defining group objects whose membership will be a list of user DNs. The Enterprise Domain and the subtree under it (for enterprise roles) will use the same ACLs for the enterprise domain entry and the subtree. The server object may also be administered by a group of administrators although the membership of this group may be different from the membership of enterprise domain administrators. Some of the security-related directory objects that may be protected using ACLs are: (a) Databases; (b) Enterprise domains; (c) Default Domain; (d) Enterprise roles; (e) Administrative groups; (f) Database Level Mappings; and (g) Domain Level Mappings. For each object, the ACL limits who can create, modify, or read them. The Default Domain could be created by default at context creation and newly created databases can be automatically placed in this domain.

A variety of access control mechanisms may be employed in the invention to implement ACLs. A first approach uses access control points ("ACP") to implement ACLs. In this approach, an entry in the directory may include one or more modifiable attributes that list users who have been assigned administrative privileges to that entry or its subtree. The access control attribute identifies the access control policies of its associated object. In addition, the access control attribute can be configured to identify access control policies for the object's subtree, which are descendants of the object, e.g., child entries.

The following are examples of two access control attributes that may be employed in the invention:

(a) ACI (access control item) attribute—This attribute can be applied to any directory entry and represents the access control policy for the subtree of entries starting with the entry where it is defined. This is an inheritable attribute that applies to all descendants of the entry where the ACI is defined.

(b) EntryLevelACI attribute—This attribute can be applied to any directory entry and represents access control only to the entry where it is defined. Even though the same control can be achieved using an inheritable ACI, this attribute is recommended for administrative and performance reasons when the scope of an ACL is a single entry.

Consider if it is desired to grant a user administrative access to any object in the subtree beneath enterprise domain object 213 in the LDAP directory of FIG. 2b. To implement this access policy, the ACI attribute for the enterprise domain object 213 is modified to provide the desired access to the user. Similarly, consider if it is desired to grant the user administrative access to only the enterprise domain entry 213 in the LDAP directory. To implement this access policy, the EntryLevelACI attribute for the enterprise domain object 213 is modified to include the user as an authorized administrative user.

An ACI in an entry can reference any suitably recognized user or group in the system. If a given group is listed in an ACI, the privileges granted by that ACI can be associated with additional users by making those users members of the listed group. As such, another approach to implementing ACLs is by creating administrative groups in the LDAP directory that are associated with particular combinations of ACIs in the system. Administrative groups can be associated with ACIs defined at any level of the directory to provide associated members of that administrative group with administrative privileges over a particular subtree or subtree entry. The following are examples of administrative groups that may be employed in an embodiment of the invention:

1. ContextAdmin Group: ContextAdmin is a group of security administrators in an enterprise. These administrators essentially comprise root privileges for a Context, and are responsible for administering other administrative groups. The entity creating the Context is preferably automatically put into all administrative groups by default, including this group. Note that this user is different from the root user for the directory. This group preferably sits directly under a cn=Groups container, which is under the cn=AdminContext entry.

2. DBSecurityAdmins Group: Members of the DBSecurityAdmins group (e.g., cn=DBSecurityAdmins, cn=AdministrativeContext) have root privileges for the Security subtree. This is a group of highly trusted administrators in an enterprise. Members of this group have create, modify, and read access for enterprise user security. Group members have permissions on all of the domains in the enterprise and are responsible for: (a) Administering the DBSecurityAdmins and DBCreators groups; (b) Creating new enterprise domains; and (c) Moving databases from one domain to another within the enterprise.

3. DBCreators Group: Members of the DBCreators group (e.g., cn=DBCreators, cn=AdministrativeContext) are in charge of creating new databases, and this includes registering each database in the directory. Members of this group have create and modify access to database service objects and attributes. They can also modify the Default Domain. These access rights are preferably established during Context creation.

4. NetAdmins Group: Members of the NetAdmins group (e.g., cn=NetAdmins, cn=AdministrativeContext) have create, modify, and read access to network relevant objects and attributes in the system. These access rights are preferably established for this group during Context creation.

5. UserSecurityAdmin Group: Members of this group are responsible for User Security, and can read wallet password hints, modify passwords, and other user security actions. The members of this group that is in the root context may be configured to have access to all such attributes in the directory. In addition, members of this group in other contexts may have access to attributes for users appearing within that Context, or appearing as peers to that Context entry.
6. DBAdmin Group: This is the group of database administrators ("DBAs") for a particular database. There is preferably one such group under each database server that is created at the time the database is registered in the directory. These group members are given all privileges for the database entry and its subtree, including database/schema mappings.
7. DomainAdmin Group: There is preferably one such group under each enterprise domain that is created at the time the domain is created. These group members are given all privileges for the domain entry and its subtree, including mappings and enterprise roles.

To illustrate this aspect of the invention, consider again the process for granting a user administrative access to any object in the subtree beneath enterprise domain object 213 in the LDAP directory of FIG. 2b. The subtree under the Administrative Context 205 in FIG. 2b could be configured to contain any number of administrative groups, such as administrative groups 207a and 207b. To implement the desired access policies for the user, the user's identification is added as a member of the administrative group 207a or 207b having an acceptable scope of privileges for enterprise domain object 213 and its subtree.

Therefore, it can be seen that access control can be given to a user directly using an ACI that lists the user and indirectly by listing a group for which the user is a member. All groups of users are preferably placed directly beneath the Administrative Context or under a groups container that sits beneath the Administrative Context.

According to an embodiment, ACLs are preferably defined at the following points in the LDAP directory: (a) Administrative Context; (b) Security container; (c) enterprise domain objects; (d) Enterprise Roles objects, although it is noted that enterprise role objects can be configured to inherit the ACL placed in its parent enterprise domain object; (e) Server Objects, which are the object classes to hold server information; (f) in the administrative groups themselves; and (g) root of user subtrees.

Figure 4:
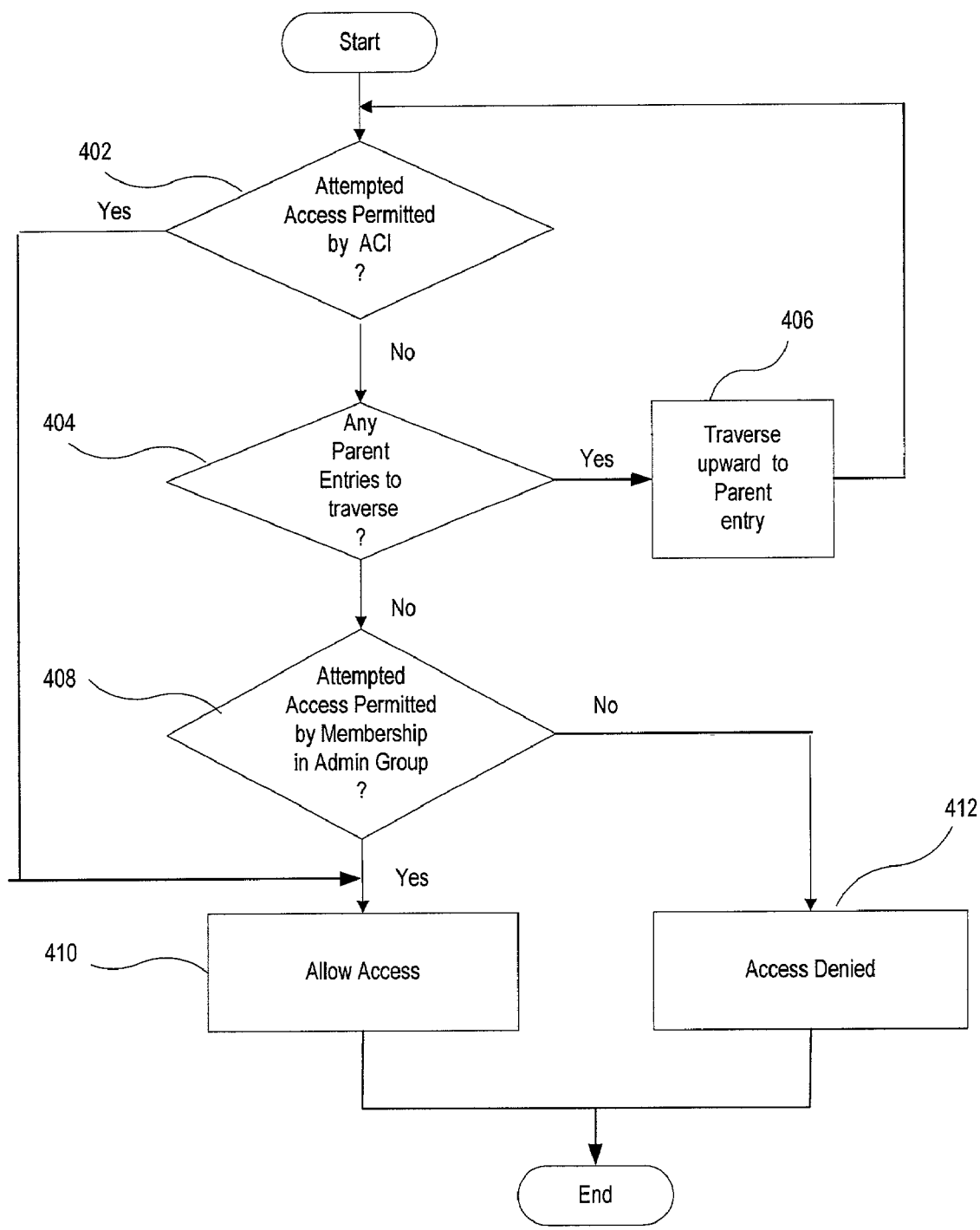
FIG. 4 shows a flowchart for a process of managing user access according to an embodiment of the invention.

FIG. 4 depicts a flowchart of a procedure for determining whether a user has administrative access rights to a particular object in the enterprise domain hierarchy according to an embodiment of the invention. At 402, the ACI attributes(s) for the object in the directory is examined to determine whether the user possesses sufficient privileges to perform the desired access operation. If sufficient privileges are identified for the user in the object's ACI, then the desired access is granted to the user (410).

If the ACI attributes for the object do not provide sufficient privileges to the user for the desired access, then a determination is made whether there exists any parent entries in the directory that could be reviewed for the required ACI attribute entries (404). If so, then the procedure traverses upward along the directory tree to examine the ACI attributes for the parent entry (406). If the parent entry has an inheritable ACI granting sufficient privileges to the user, then the desired access is granted to the user (410). Otherwise, the determination of 404 is made regarding further parent entries in the directory. This continues until no further candidate ancestor entries exist in the directory (e.g., no further parent entries exists in the relevant administrative context), or until a threshold number of parent entries have been examined for the desired ACI values, or until an inheritable ACI attribute in an ancestor entry provides the desired access.

If there exists no ACI (entry level or inheritable) that provides the user with the desired access privileges, then a determination is made whether the user is a member of an administrative group that confers the requested access privileges (408). If so, then the user is granted the desired administrative access to the enterprise domain object (410). If not, then access is denied (412).

Example ACL Implementation

This section provides syntax examples for ACLs for an installation where the directory context (which in an embodiment is the parent entry of the Administrative Context or "AdminContext") is represented as <DC>. DC could be any context in the directory; for example, it could be "c=uk, o=acme" in FIG. 2b. The following lists some example access control items that may be put into place. The example ACLs are meant to illustrate typical scenarios where permissions may be granted to certain groups, such as the administrative groups listed above.

For the administrative context (CN=AdminContext, <DC>), this first ACI sets the default privileges for the entire context, and it allows members of the Context administrative group full privileges on the context. Others will obtain browse permission only by default on the objects in the context. This ACI preferably resides at the administrative context.

ACI: access to entry by group="cn=ContextAdmins, cn=AdminContext,<DC>" (browse,add,delete) by *(browse,noadd,nodelete)

This next ACI allows DB Creator and NetAdmin group members to add objects directly under the context root. DB creators use this set of privileges to create new database objects under the context root. Preferably, only DB creators can add database objects at this location. This ACI is an entry level ACI, so it is not inherited for objects in a subtree; therefore, DB creators cannot add objects lower down in the tree based upon this ACI. Note that it does not specify that others can browse in this ACI, or that DBSecurityAdmin group members have any privileges, because any accesses on this object that are unresolved by this ACI are referred to the inheritable ACI in the same object (listed above).

EntryLevelACI: access to entry by group="cn=DBCreators,cn=AdminContext,<DC>" (add) by group="cn=NetAdmins,cn=AdminContext, <DC>" (add)

This next ACI allows Context administrative group members full permissions on all attributes in the context, and others read permissions on all attributes. This read permission is denied for others in places at lower levels.

ACI: access to attr=(*) by group="cn=ContextAdmins, cn=AdminContext, <DC>" (read,search,write,seelfwrite,compare) by *(read, search,nowrite, noselfwrite, compare)

The following ACIs are not on the administrative context entry. For a server object (shown as entry 291 in FIG. 2b), the entries below are examples of ACIs that could be used to add user "Scott" as a DBA for this database server, which grants this user permissions to modify directory entries relating to this database. According to an embodiment, there are no default ACIs created with a new server object. These ACIs are preferably associated with the database entry.

ACI: access to entry by dn="cn=scott,<DC>" (browse,add, delete)

ACI: access to attr=(*) by dn="cn=scott,<DC>" (read, search,write,compare,selfwrite)

Alternatively, the following ACI can be used to allow members of the DBAdmins group (entry 290 in FIG. 2b) permissions to modify directory entries relating to the database Server1 291, and the relevant ACI is preferably added by default when the server entry is created. When an entity is added as a DBA for the server, they can be added as a new member of the DBAdmins group under the server entry. In addition, the server ACI need not be modified—only the group member list is updated in an embodiment. These ACIs are also preferably associated with the database entry.

ACI: access to entry by group="cn=DBAdmins, cn=Server1, CN-AdminContext, <DC>" (browse,add, delete)

ACI: access to attr=(*) by group="cn=DBAdmins, cn=Server1,CN=AdminContext, <DC>" (read,search, write,compare,selfwrite)

The following ACI can be used to provide members of the context admins group with full permissions via ACI inheritance from the Context object; members of the DB Security Admins group obtain full permissions explicitly at this level, and members of the DB creators group obtain browse permission at this level so that DB creators can put the newly registered DBs into the default domain. These ACIs are preferably on the security container entry.

ACI: access to entry by group="cn=DBSecurityAdmins, cn=AdminContext, <DC>" (browse,add,delete) by group="cn=DBCreators,cn=AdminContext,<DC>" (browse) by *(none)

ACI: access to aftr=(*) by group="cn=DBSecurityAdmins, cn=AdminContext,<DC>" (read,search,write,selfwrite, compare) by group="cn=DBCreators,cn=AdminContext,<DC>" (read, search,compare) by * (none)

For a default domain object (CN=DefaultDomain, CN=Security, CN=Products, CN=AdminContext, <DC>), the following ACI provides privileges for members of the DB creators group to read and modify the default domain object. Since it is not desired to grant privileges to modify the possible mappings underneath, an entry level ACI is used to grant write permission on this object only. The DB Creators' read permissions are inherited from the Security object above. Restrictions for other users are also inherited from the Security Container ACI. These ACIs are preferably on the default domain entry.

EntryLevelACI: access to attr=(*) by group="cn=DBCreators,cn=AdminContext,<DC>" (write,selfwrite)

In addition, when a database is registered and becomes a member of this domain, the ACI should not only allow the database read access to the default domain, but also to any roles and mappings that are underneath it. It need not specify that the database cannot modify anything, because that restriction can be inherited from the Security object ACI. The following ACIs can be used when a database becomes a member of a domain and are preferably associated with the enterprise domain entry:

ACI: access to entry by dn="cn=<serverCN>, cn=AdminContext,<DC>" (browse)

ACI: access to attr=(*) by dn="cn=<serverCN>, cn=AdminContext,<DC>"(read,search,compare)

Alternatively, if the domain is defined as a group object, the database members of the domain are members of the group, such that the same security functionality can be obtained by adding that DB as a new uniquemember for the domain, and including the main itself (and therefore its uniquemembers) in its own ACI. The restriction that allows a DB from modifying the domain is inherited from the Security object ACI. The lowing ACIs are preferably associated with a domain entry:

ACI: access to entry by group="cn=Domain,cn=Security, cn=Products, cn=AdminContext,<DC>" (browse)

ACI: access to aftr=(*) by group="cn=Domain, cn=Security, cn=Products, cn=AdminContext,<DC>" (read,search,compare)

In this approach, when a database becomes a member of a domain, the ACI need not be updated to include the database.

When a new domain administrator is added, the following expanded ACI may be added to provide access:

ACI: access to entry by dn="<domain admin DN>" (browse,add,delete)

ACI: access to attr=(*) by dn="<domain admin DN>" (read,search,compare,self-write,write)

Alternatively, the following ACI may be used for a domain to take advantage of the existence of a domain admins group:

ACI: access to entry by group="cn=DomainAdmins, cn=<Domain name>,cn=Security,cn=Products,cn=AdminContext, <DC>" (browse,add,delete)

ACI: access to attr=(*) by group="cn=DomainAdmins, cn=<Domain name>,cn=Security,cn=Products,cn=AdminContext, <DC>" (read,search,compare,selfwrite,write)

When a new domain administrator is needed, the new administrator's DN can simply added as a new uniquemember to the Domain Admins group under the domain entry. Thus, the ACI in the domain entry need not be modified to add either new domain admins or new databases.

For members of the DB creators group (CN=DBCreators, CN=AdminContext, <DC>), the following ACI may be used to provide that group members can see all other members in the group, but cannot modify the group in any way. Note that DB creator group members do not need explicit noadd or nodelete settings because they inherit those from the context object ACI.

ACI: access to entry by group="cn=DBCreators, cn=AdminContext,<DC>" (browse) by *(none)

ACI: access to attr=(*) by group="cn=DBCreators, cn=AdminContext,<DC>" (read,search,compare) by *(none)

The DB Security administrative members (CN=DBSecurityAdmins, CN=AdminContext,<DC>) could obtain privileges on their own group using the following ACI:

ACI: access to entry by group="cn=DBSecurityAdmins, cn=AdminContext,<DC>" (browse,add,delete) by *(none)

ACI: access to attr=(*) by group="cn=DBSecurityAdmins, cn=AdminContext,<DC>" (read,search,write,selfwrite, compare) by *(none)

It is noted that the members of the Context Admins group have all privileges on all the groups inherited from the top administrative context entry ACI for a given context.

Shared User Schema

A benefit of the present invention for managing users in a directory is that the number of user accounts created for the distributed databases can be reduced. For example, suppose users John, Mary, and Jane are all users of an application that accesses a Finance database. In conventional approaches to user management, a separate account or schema would be created on the Finance database for each of these users. If there are additional databases that these users seek to access, then a separate user schema is created at every such database. However, creating individual schemas for each user on each database could be overly expensive and inefficient, particularly if there are a large number of users/thin clients accessing the database and many of those users seek to access the same database applications. This is particularly true if the users do not need to create their own objects in the database. The present invention provides a method and mechanism for allowing users to share schemas on a database such that users do not need their own accounts or schemas.

The present invention supports a method and mechanism for mapping one or more enterprise users to the same "shared schema" on an individual database. A shared schema is a schema that is accessible by more than one enterprise user in the system. Instead of creating a separate user account or schema in each database a user needs to access, as well as creating the user in the directory, the enterprise user identification is created once in the directory and the enterprise user is "pointed" at a shared schema that many other enterprise users can also access. In effect, user-schema separation eliminates the need to have a dedicated database schema on each database for every enterprise user. Each enterprise user can be mapped to a shared schema on each database he needs to access.

Figure 7:
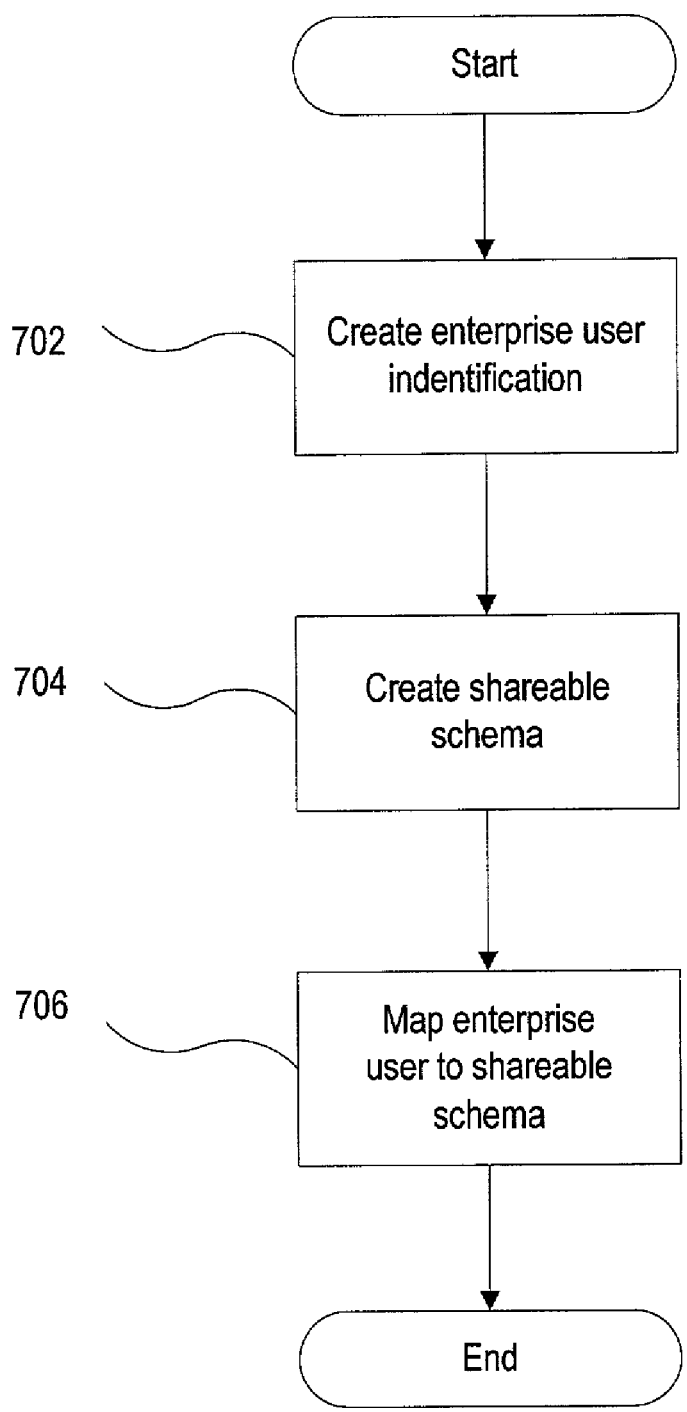
FIG. 7 shows a flowchart of a process for creating a shared schema according to an embodiment of the invention.

FIG. 7 depicts a flowchart of a process for implementing shared schemas according to an embodiment of the invention. At 702, an enterprise user identification is created in the directory. This step may be implemented, for example, by populating an LDAP directory with user objects representing unique DN entries for each individual enterprise user in the system. At 704, a shareable schema is created at a database. Each database may include any number of such shareable schemas. In an embodiment, a shareable schema is created with organizational/physical characteristics like any unique user schema created on a database, but is identified as being sharable among multiple enterprise users. Like a unique schema, the shareable schema is therefore associated with a local/native database username. For each database that an enterprise user seeks to access, the enterprise user may be "mapped" to a shareable schema on that database (706). The enterprise user may also be mapped to shareable schemas on multiple databases.

The mapping between enterprise users and a schema can be locally performed at the database itself or centrally at the directory. In an embodiment, the mapping is performed in the directory by means of one or more mapping objects. This mapping can be specific to a single entry on a single directory level, or can be a mapping that applies to an entire subtree of entries. The mapping objects can be defined at the database level or at the domain level. According to an embodiment, if the mapping is at the domain level, then this provides a default mapping for the specified users at databases in the domain.

A single-level mapping object is referred to as an "EntryLevelMapping" or "full DN mapping" object. This mapping object maps the full Distinguished Name (DN) of a user, e.g., as contained in a user's X.509 certificate, to a database schema that the user will access. This mapping results in one mapping entry per user for the database. There can be any number of full DN mappings for a database that map multiple users to the same schema. When using full DN mapping, each enterprise user can either be mapped to a unique or private schema or to a shared schema. In an alternate embodiment, a unique user attribute, e.g., a global user ID, is mapped instead of the DN.

A subtree mapping object is referred to herein as a "SubtreelevelMapping" or "partial DN mapping" object. This approach maps enterprise users to schemas using partial DN mapping. A partial DN mapping is particularly useful if multiple enterprise users that have something in common are already grouped under some common root in the directory tree. The subtree corresponding to these users can be mapped to a shared schema on a database. For example, all enterprise users in the directory subtree corresponding to a particular organizational division can be mapped to the same shared schema on commonly accessed database(s). In this way, multiple enterprise users sharing part of their DN can access the same shared schema.

When determining the schema to which a user is connected, the database uses the following precedence rules in an embodiment. The database first looks for the mapped schema locally. If the schema mapping is not found locally, then the directory is searched. Within the directory, the database looks under the server object, first for a full DN mapping, then for a partial DN mapping. If the database does not find a mapping object under the server object, it looks under the domain object, first for a full DN mapping, then for a partial DN mapping. If the database does not find a mapping object in the domain object, then the database refuses the connection.

Figure 5:
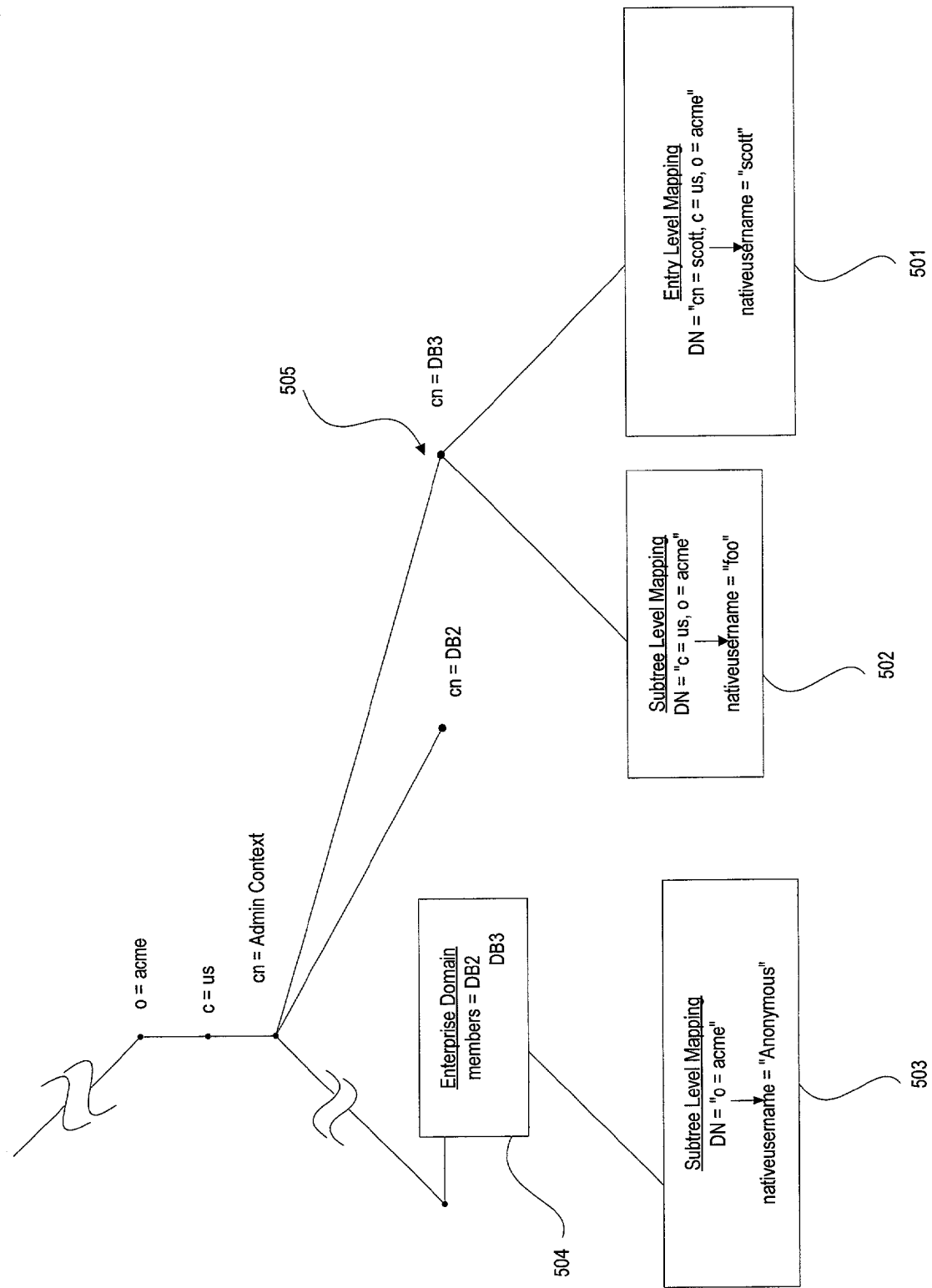
FIG. 5 shows a directory information tree with mapping objects according to an embodiment of the invention.

FIG. 5 illustrates mapping objects in a directory according to an embodiment of the invention. An entry-level mapping object 501 has been established for the user having a full DN of "cn=scott,c=us,o=acme", which maps this enterprise user to the local schema "scott" in the DB3 database ("NativeUserName" identifies the local schema for object 501 in this example). Only the user matching the specified DN is mapped based upon this entry level mapping object. Note that the mapping object 501 for database DB3 resides in the subtree below the database server object 504 for database DB3. Mapping objects specific to a particular database are preferably located in the subtree beneath that database server object.

A subtree-level mapping object ("SubtreelevelMapping") 502 in the subtree beneath the database server object 505 (database DB3) has been established for users having the partial DN "c=us,o=acme", which maps these users to the local schema "foo" in the DB3 database. If a subtree-level mapping object is created, then all users beneath the given partial DN will be mapped to the local/native user schema. Multiple users may fall within the scope of a subtree-level mapping object.

A subtree-level mapping object 503 has also been established beneath the enterprise domain object 504 for users having the partial DN "o=acme", which maps these users to the schema "Anonymous" on the DB2 and DB3 databases.

The user having a full DN "cn=scott,o=acme,c=us" falls within the defined scope of more than one of the mapping objects 501, 502, and 503 in FIG. 5. As noted above, entry-level mapping objects take precedence over subtree-level mapping objects in an embodiment. When multiple subtree-level mapping objects apply to a user, the subtree-level mapping object with the specific subtree root lower in a directory tree preferably takes precedence over a subtree-level mapping with a subtree root higher in the directory. Also, any database specific mappings preferably takes precedence over domain mapping objects.

Figure 6A:
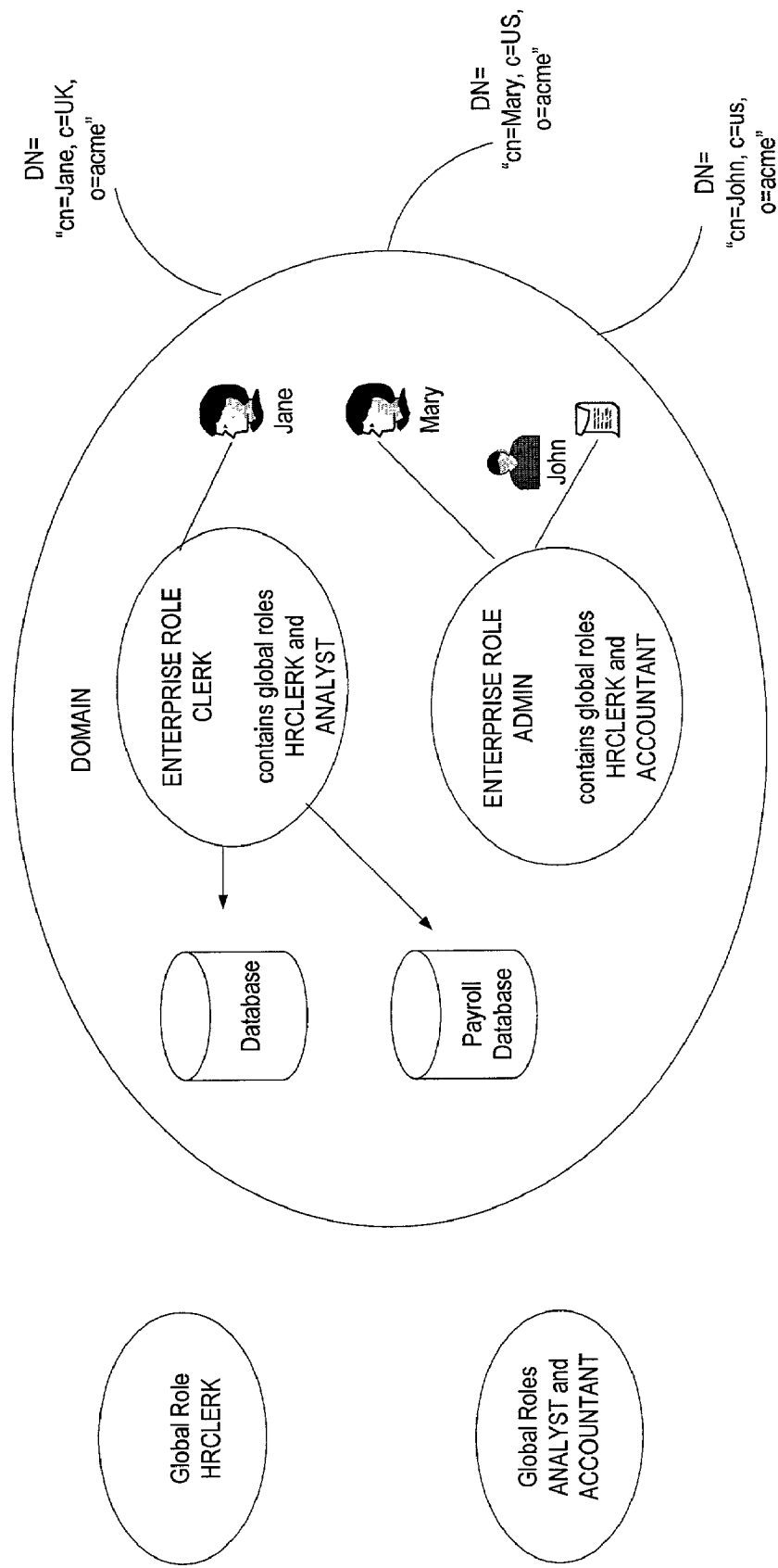
FIG. 6a depicts components of an example distributed system.
Figure 6B:
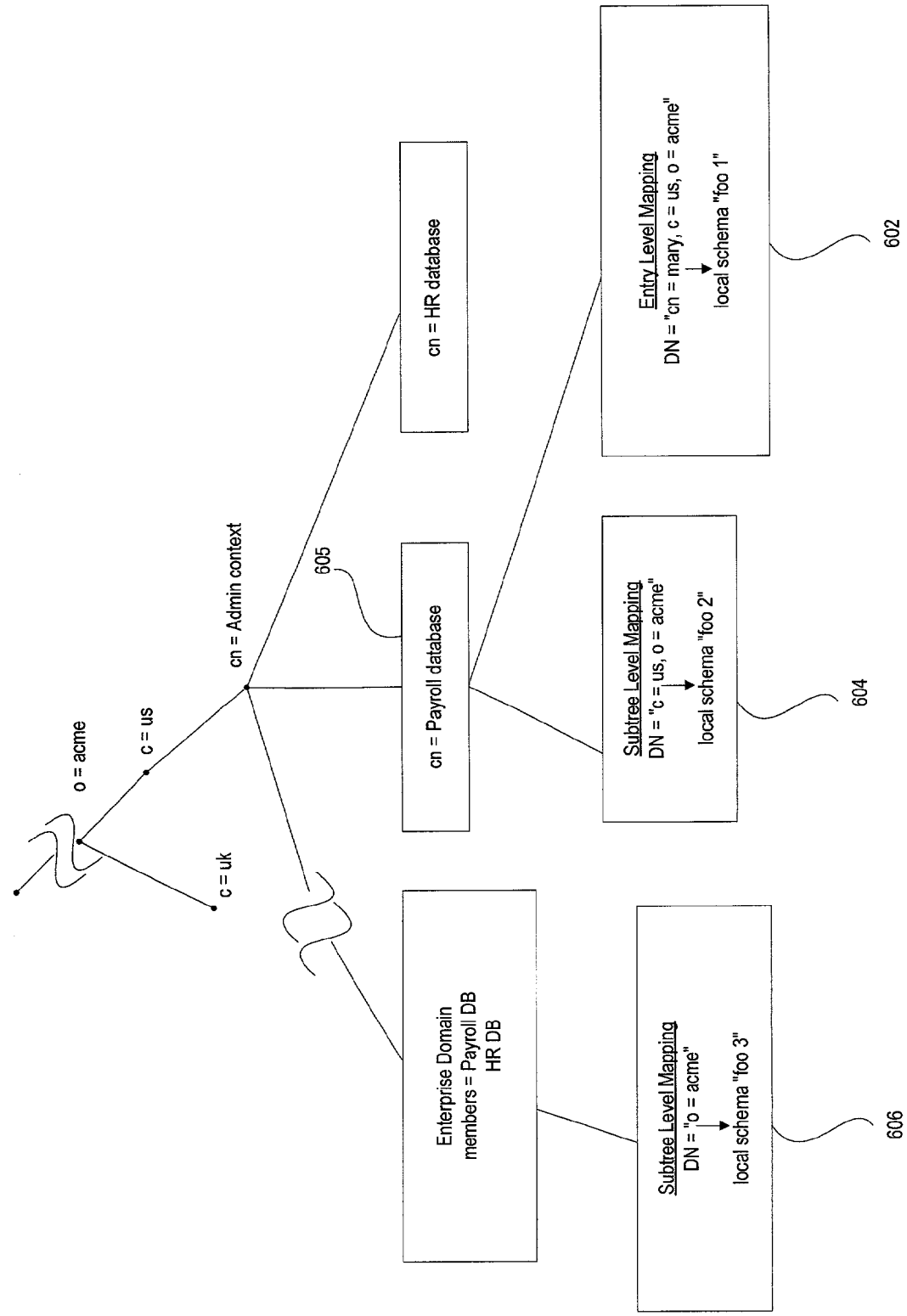
FIG. 6b shows a directory information tree.

FIGS. 6a and 6b illustrate a usage scenario for the invention. In FIG. 6a, an enterprise role ADMIN is associated with the global role HRCLERK on the Human Resources database and the ACCOUNTANT role on the Payroll database. In addition, an enterprise role CLERK is associated with the global role HRCLERK on the Human Resources database and the ANALYST role on the Payroll database. As already stated, an enterprise role can be granted or revoked to one or more enterprise users, e.g., an administrator could grant the enterprise role CLERK to a number of enterprise users who hold the same job.

Several enterprise users are defined in the system. User Jane has a full DN of "cn=Jane,c=uk,o=acme". User Mary has a full DN of "cn=Mary,c=us,o=acme". User John has a full DN of "cn=John,c=us,o=acme". In this example, users John and Mary are both associated with the enterprise role ADMIN. User Jane is associated with enterprise role CLERK. Such associations between users and roles may be implemented, for example, using the methods and mechanisms described with reference to FIGS. 2–3.

Consider if it is desired to map enterprise users John, Mary, and Jane to shared schemas on the HR and Payroll databases. In this scenario, one or more shared schemas are created for both the HR and Payroll databases. For example, shared schemas "foo1", "foo2", and "foo3" can be created on both databases. Referring to FIG. 6b, the LDAP directory is modified to include mapping objects 602, 604, and 606 to map users John, Mary, and Jane to these shared schemas.

Mapping object 602 sits in the directory tree beneath the database server object 605, and is an entry-level mapping object that maps the full DN of user Mary to the local schema "foo1" on the Payroll database. Mapping object 604 also lies beneath database server object 605, and is a subtree-level mapping object that maps all users having the partial DN "c=us,o=acme" to the local schema "foo2" on the Payroll database. Mapping object 606 is a domain mapping object, e.g., a subtree-level mapping object defined at the domain level, that maps all users having the partial DN "o=acme" to the local schema "foo3" on either the HR or Payroll databases.

When user Mary logs into the Payroll database, she will be associated with the local schema "foo1" based upon the entry-level mapping object 602. The scope of her privileges on the Payroll database is defined by her membership in the enterprise role ADMIN, i.e., the global role ACCOUNTANT on the Payroll database, as well as any roles and privileges locally defined for the "foo1" schema. Note that there is no entry-level mapping object that maps user Mary to a local schema for the HR database. Instead, a domain mapping object 606 maps all users having the partial DN "o=acme", which includes user Mary, to the local schema "foo3" on both the HR and Payroll databases. Thus, user Mary will log into the HR database using the "foo3" shared schema. Her privileges on the HR database are defined by her membership in the enterprise role ADMIN, i.e., the global role HRCLERK, as well as any local roles and privileges locally defined for the "foo3" schema.

There is a possible conflict between the entry-level mapping object 602, the database subtree-level mapping object 604, and the domain subtree-level mapping object 606 in mapping user Mary to a schema on the Payroll database (i.e., entry-level mapping object 602 maps user Mary to schema foo1, the database subtree-level mapping object 604 maps users Mary to schema "foo2", and domain subtree-level mapping object 606 maps user Mary to schema foo3). When there is a conflict between an entry-level mapping object and subtree-level mapping objects, then the entry-level mapping preferably takes precedence over the subtree-level mappings. Thus, the mapping of user Mary for a shared schema on the Payroll database is defined by the entry-level mapping object 602 rather than the subtree-level mapping objects 604 and 606.

When user John logs into the Payroll database, he will be associated with the local schema "foo2" based upon the subtree-level mapping object 604. The scope of this user's privileges on the Payroll database is defined by his membership in the enterprise role ADMIN, i.e., the global role ACCOUNTANT on the Payroll database, as well as any roles and privileges locally defined for the "foo2" schema. A domain mapping object 606 exists that maps all users having the partial DN "o=acme", which includes user John, to the local schema "foo3" on both the HR and Payroll databases. Thus, user John will log into the HR database using the "foo3" shared schema. His privileges on the HR database are defined by membership in the enterprise role ADMIN, i.e., the global role HRCLERK, as well as any local roles and privileges locally defined for the "foo3" schema.

There is a possible conflict between the database subtree-level mapping object 604 and the domain subtree-level mapping object 606 in mapping user John to a schema on the Payroll database. When this type of conflict occurs, the database subtree-level mapping preferably takes precedence over the domain subtree-level mapping. Thus, the mapping of user John for a shared schema on the Payroll database is defined by the database subtree-level mapping object 604 rather than the domain subtree-level mapping object 606.

When user Jane logs into either the Payroll or HR databases, there are no database-specific mapping objects to map a local shared schema for user Jane. Instead, the domain mapping object 606 maps all users having the partial DN "o=acme", which includes user Jane, to the local schema "foo3" on the HR and Payroll databases. Thus, user Jane will log into the HR and Payroll databases using the "foo3" shared schema. The scope of this user's privileges on both databases is defined by membership in the enterprise role CLERK, i.e., the global role ANALYST on the Payroll database and the global role HRCLERK on the HR database. This user also gains the roles and privileges associated with the local schema "foo3" on each database.

When any of these users connect to a database, he/she is automatically connected to a schema based upon the relevant mapping object for that user and database. As shown in FIGS. 6a and 6b, multiple enterprise users can be mapped to the same shared schema. However, the privileges associated with each user may be different, despite the shared schema, by associating each user with a specific enterprise role or roles. Moreover, since each user logs in under an individual enterprise username, the users can be individually audited for their access history despite the shared schemas. In addition, no or minimal administrative overhead is required at a database server to provide an enterprise user with access to the server, since the user can be mapped to an existing shared schema.

Figure 8:
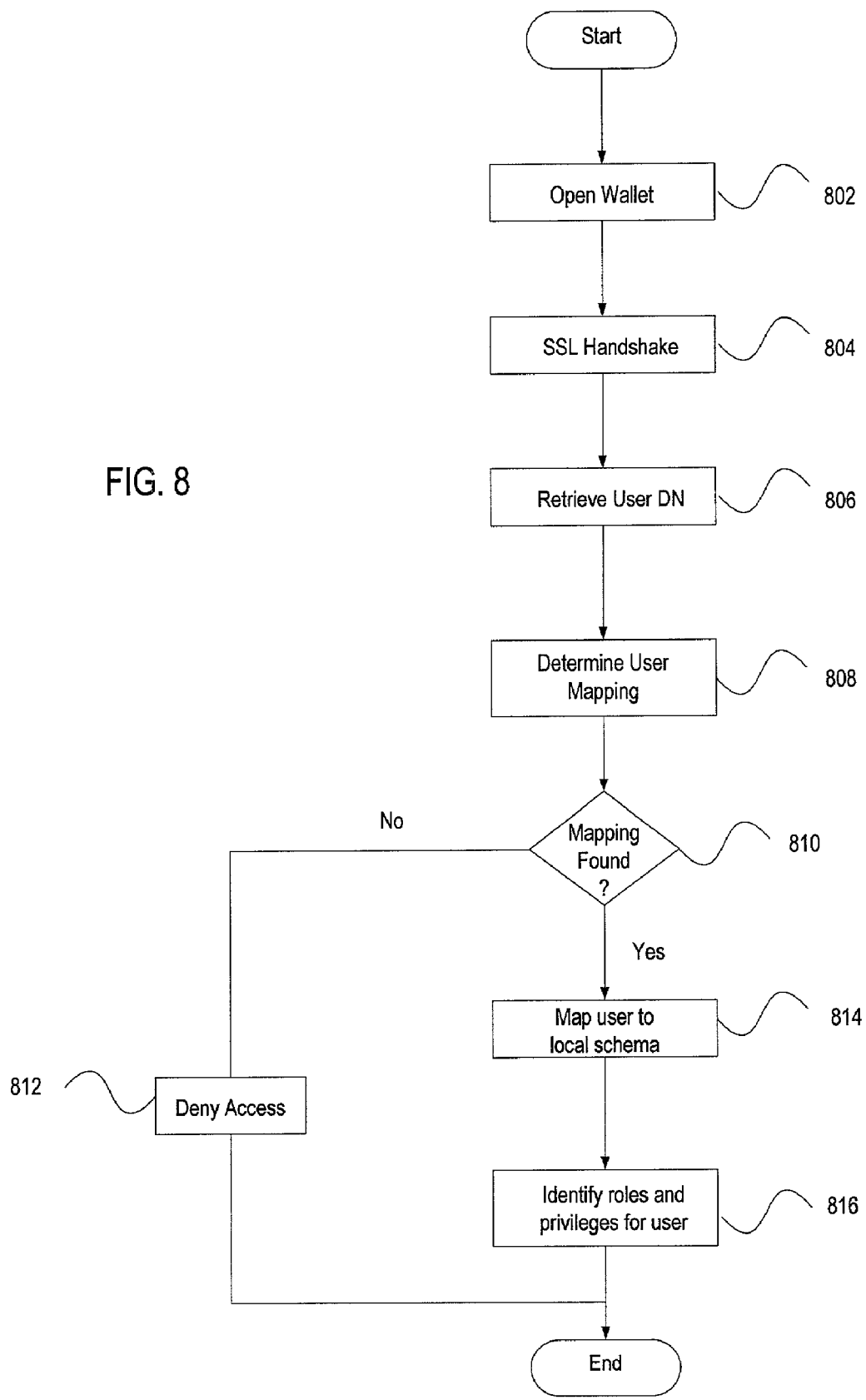
FIG. 8 shows a flowchart of a process for using shared schemas according to an embodiment of the invention.

Referring to FIG. 8, shared schema functionality in an embodiment of the present invention uses SSL for authentication to the database. SSL authentication occurs as follows in an embodiment: Prior to connecting to a database, an enterprise user opens a wallet by providing a password (802). When connecting, an SSL handshake is performed with the database, during which the user's unique certificate is passed to the server; this handshake authenticates the user to the server (804). The database extracts the user's DN from the user's certificate and looks it up in the database (806). If the database does not find the DN locally, it looks up the appropriate DN mapping in the directory (808). This DN mapping object in the directory associates a user with a database schema. In an embodiment, the database may find: (a) a Full DN (entry-level) mapping which associates the DN of a single directory user with a particular schema on a database; (b) a Partial DN (subtree-level) mapping which associates multiple enterprise users within the same subtree to the same shared schema; or (c) no mapping at all. If the database does not find either the DN locally or an appropriate DN mapping object in the directory (810), it refuses the user's connection to the database (812). If the database does find either the DN locally or the appropriate DN mapping object in the directory, the database allows the user to log on. The database then maps the user to the associated schema (814). The database retrieves this user's global roles for this database from the directory (816). The database also retrieves from its own records any local roles and privileges associated with the database schema to which the user is mapped. The database uses both the global and the local roles to determine the information that the user can access.

In an embodiment, a local database server may "opt out" from the shared schema arrangement described above. For example, this can be accomplished by ensuring that no sharable schemas are created at the local server. Thus, mappings cannot occur between an enterprise user and a shared schema. In addition, the local database server can be configured such that users can use local roles only and do not utilize global roles in the directory. To implement this in an embodiment, global roles are not created by the local server. If this configuration is set, the database uses only local roles to determine the scope of user access.

This allows users and database servers to use the central directory for client authentication, but manage user roles locally.

Current User Links

Users at a first database may perform operations that require access to a second database. For example, the user at the first database may execute a database query operation that selects data from a table or object in the second database. As another example, the user at the first database may create a procedure or function with an embedded linking operation that performs one or more operations at the second database.

To illustrate, consider if a user Scott creates a procedure scott.p on a first database DB1 to maintain and update some tables, but would like to grant another user Jane permission to perform the actual work on his behalf. This can be accomplished by granting user Jane execute privileges for the procedure scott.p in which execution of the procedure by Jane creates a temporary security context switch to Scott's security context, such that Jane has access to Scott's objects. In effect, this approach causes the system to consider the "current" user to be Scott, although Jane (the "connected" user) is actually executing the procedure. This dynamic security context switch can be configured to occur whenever a first user executes another user's procedure or view, which effectively allows users to create procedures and grant privileges in such a way as to allow others controlled access to the first users' objects.

Now consider if the procedure scott.p includes a link to a second database DB2. It is often desirable to provide the user that executes a procedure with a security context consistent with the owner of the procedure, particularly when the procedure includes a network link to a second database. In the present example, when user Jane executes procedure scott.p, then the network link to the second database DB2 should be consistent with the security context of the rest of the procedure; that is, user Jane should connect to DB2 with user Scott's security context, and thus temporarily have the necessary privileges to access the appropriate objects on database DB2.

One approach to providing a user access to a second database from a first database is with "connected-user" links, which are also referred to as "anonymous" links. A connected-user link uses the credentials of the connected user to obtain access to a remote database. In the present example, if user Jane executes the procedure scott.p on a first database DB1, which uses a connected-user link to the second database DB2, then user Jane will be connected to the second database using the security context for user Jane (the connected user) rather than the security context for user Scott (the owner of the procedure). Thus, it is possible that the user executing a procedure owned by another would not obtain the necessary access privileges on the remote database to successfully execute the procedure.

An alternate linking approach is to use "fixed user" or "named" links. Unlike a connected-user link, a named link contains both the connect string and the appropriate user credentials (e.g., username/password or other authentication information) for the relevant account on the remote server. Thus, named links allow a user on a first database to execute a procedure at a second database using the security context of another user. The drawback to this approach is that providing this authentication information in a named link creates a potential security problem, since the authentication information may become available to unauthorized users or administrators that have access to the named link on either the source or target databases. Encrypting the password information is not an optimal solution since management and transmission of encryption keys between databases provides another potential source of security failure.

The present invention provides a method and mechanism (referred to herein as "current user links") for providing connection links as a current user from a first database to a second database without requiring explicit transmission of authentication credentials in the network link between the databases. According to an embodiment, the link to the remote database is embedded into the stored object that is executed. By embedding the database link in a stored object (such as a procedure, view, or trigger), the owner of the stored object can ensure that connection is made using the owner's security context. When any user runs a stored object, the privilege domain of the object owner is used. In an embodiment, this occurs by passing the DN of the current user from the first database to the second database. The transmitted DN is used to map the connected user to the appropriate schema at the second database and for authorizing privileges. Mapping objects may be used to perform this mapping at remote databases.

When executing a stored object (such as a procedure, view, or trigger) in an embodiment of the invention, the current user is the user that created the stored object, and not the user that called it. For example, if the database link appears inside procedure scott.p, created by user Scott, and user Jane calls procedure scott.p, then the current user will be Scott—not user Jane. However, if user Jane uses the database link directly, and not from within procedure scott.p, then the current user will be Jane. Thus, in the case of a database link being used directly, the current user will be the same as the connected user.

Figure 9:
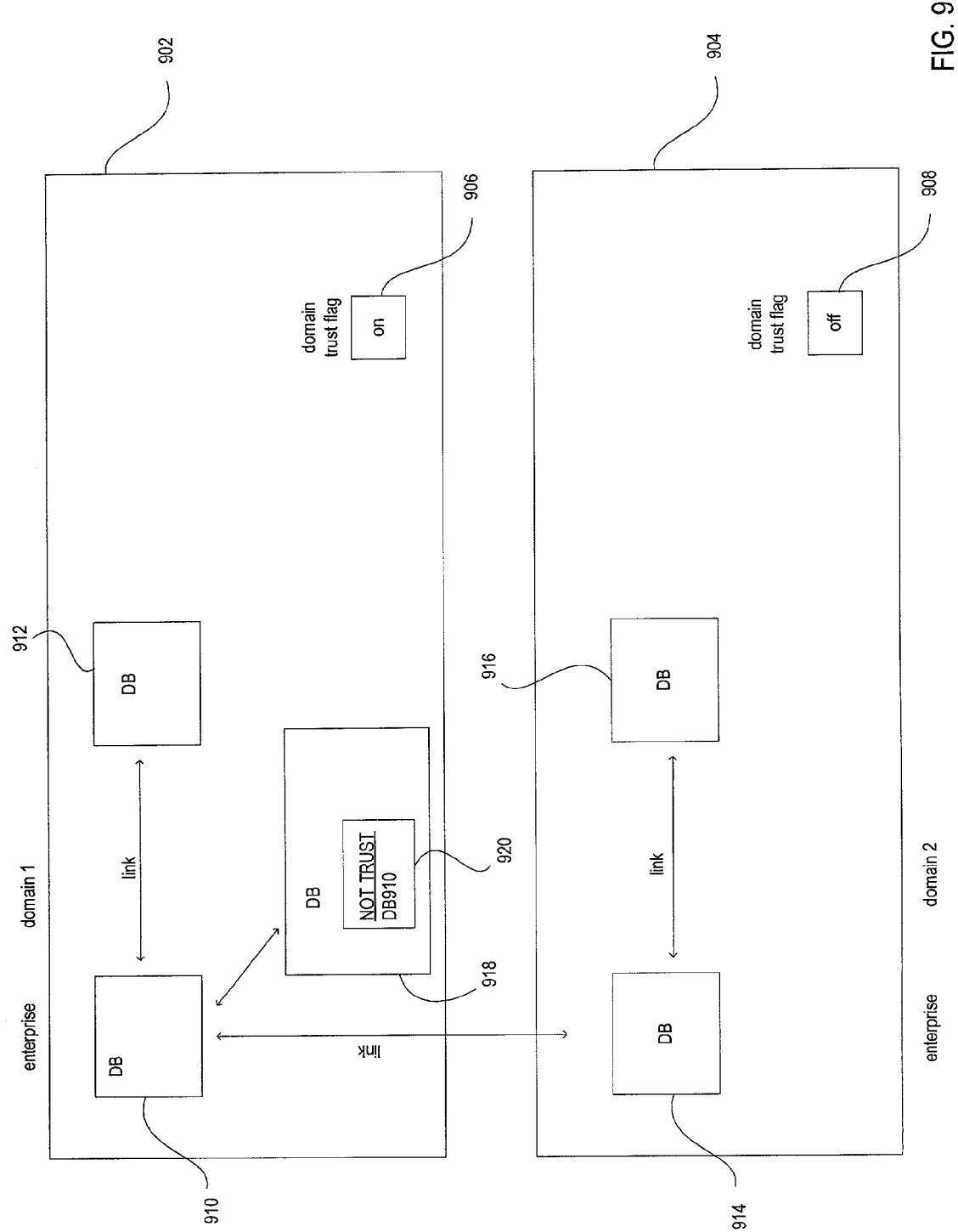
FIG. 9 is a diagram showing components used for current user links according to an embodiment of the invention.

To eliminate the need to pass authentication credentials from one database to another trusted relationships can be implemented between database servers. FIG. 9 illustrates an embodiment of this aspect of the invention. Shown in FIG. 9 is a first enterprise domain 902 and a second enterprise domain 904. Each enterprise domain is associated with a domain "trust flag". A domain trust flag is a flag that indicates whether other databases within the same enterprise domain should be trusted. According to an embodiment, the domain trust flag is a field in a domain object entry in the LDAP directory. If the domain trust flag is set "on", then a user executing an application on a first database is permitted to link to another database within the same enterprise domain without providing additional authentication credentials ("current user link"). Instead, the second database will trust that the first database had already properly authenticated the user, and that this authentication should be accepted at the second database. Thus, the second database will not independently authenticate the user before allowing access. If the domain trust flag is set "off", then the second database will not accept the link until proper authentication credentials have been verified.

Enterprise domain 902 is associated with a domain trust flag 906 that is turned "on". Since the domain trust flag 906 is turned on, users on a first database 910 in enterprise domain 902 that seek to access a second database 912 within the same enterprise domain will be permitted to do so without providing authentication credentials to the second database 912. The database must be able to trust that the communications are really coming from a trusted database within the same enterprise domain. According to an embodiment, SSL is used to authenticate that a communications link is established from a trusted database within the same enterprise domain. Even if data is sent in only one direction between two trusted database servers, mutual authentication is preferably performed using SSL between the two databases.

Enterprise domain 904 includes a domain trust flag 908 that is turned "off". Since the domain trust flag is turned off, current user links according to an embodiment of the invention cannot be formed between databases in this enterprise domain 904. Thus, users on a database 914 in enterprise domain 904 cannot use current user links to connect to database 916 within the same enterprise domain unless authentication credentials are supplied to database 916 sufficient to allow the desired access.

According to the present embodiment, current user links (also referred to as trusted links) can be formed only for database servers within the same enterprise domain. Thus, a database 910 in enterprise domain 902 cannot form a current user link to database 914 in enterprise domain 904 unless proper authentication credentials are verified by both databases, even if the domain trust flag in turned on in both domains. According to an alternate embodiment, additional trust flags of varying scope may be employed to permit current user links between database servers in different enterprise domains.

Lists could be established to identify which servers are to be trusted by other servers within the domain. This can be explicitly implemented using a central "trusted servers list" that lists all servers that should be trusted by other servers in the domain when establishing a current user link. Alternatively, this can be implicitly implemented by considering all recognized servers in the domain to be centrally "trusted" if the domain trust flag is turned "on."

Each database server may also maintain a local trusted servers list that explicitly lists which database servers it will or will not trust, which allows each server to locally decide whether to "opt out" of the trusted server arrangement with respect to one or more of the other database within the domain. In the system shown in FIG. 9, database server 918 in enterprise domain 902 includes a local trusted servers list 920 that lists database server 910 as an untrusted server. Thus, a link cannot be established from database server 910 to database server 918 unless the user's authentication credentials are supplied and verified, even if the domain trust flag 906 is turned on. However, a current user link can be established to database server 918 from other database servers in the same enterprise domain that are not listed as untrusted in trusted servers list 920 (e.g., server 912).

The present invention therefore provides a mechanism that allows databases the flexibility to distrust some, but not necessarily all, members of their distributed enterprise domain. This partial trust of the domain may produce a transitivity problem under certain circumstances. For example, assume that databases A, B, and C are all members of the same domain. A and B trust each other, and B and C trust each other, but C doesn't trust A. Even though C doesn't trust A, a user on A can still execute a procedure on A that via a database link connects to and executes a procedure on B, that in turn connects to C. Database C may not realize that the initiator of these links was on A, an untrusted database.

According to an embodiment, the solution is to propagate information with current user links that indicate all prior <database, user> pairs in the current chain of links, which is used in conjunction with local lists of trusted database servers. In a chain of current user links, each database will need to ensure that there is no member of the link chain that is untrusted. Thus, prior to establishing a current user link, the remote database will examine the entire list of prior databases in the chain to ensure that no databases in the chain are listed as "untrusted" in the local trusted servers list.

In one approach, each database in the chain appends to the chain information with the identity of itself and the current user prior to establishing a current user link to the next database. In an alternate approach, the second database in current user link appends the chain information with the <database, user> information for the initiator of the link. Under either approach, each database along the way adds to the chain information.

Figure 10:
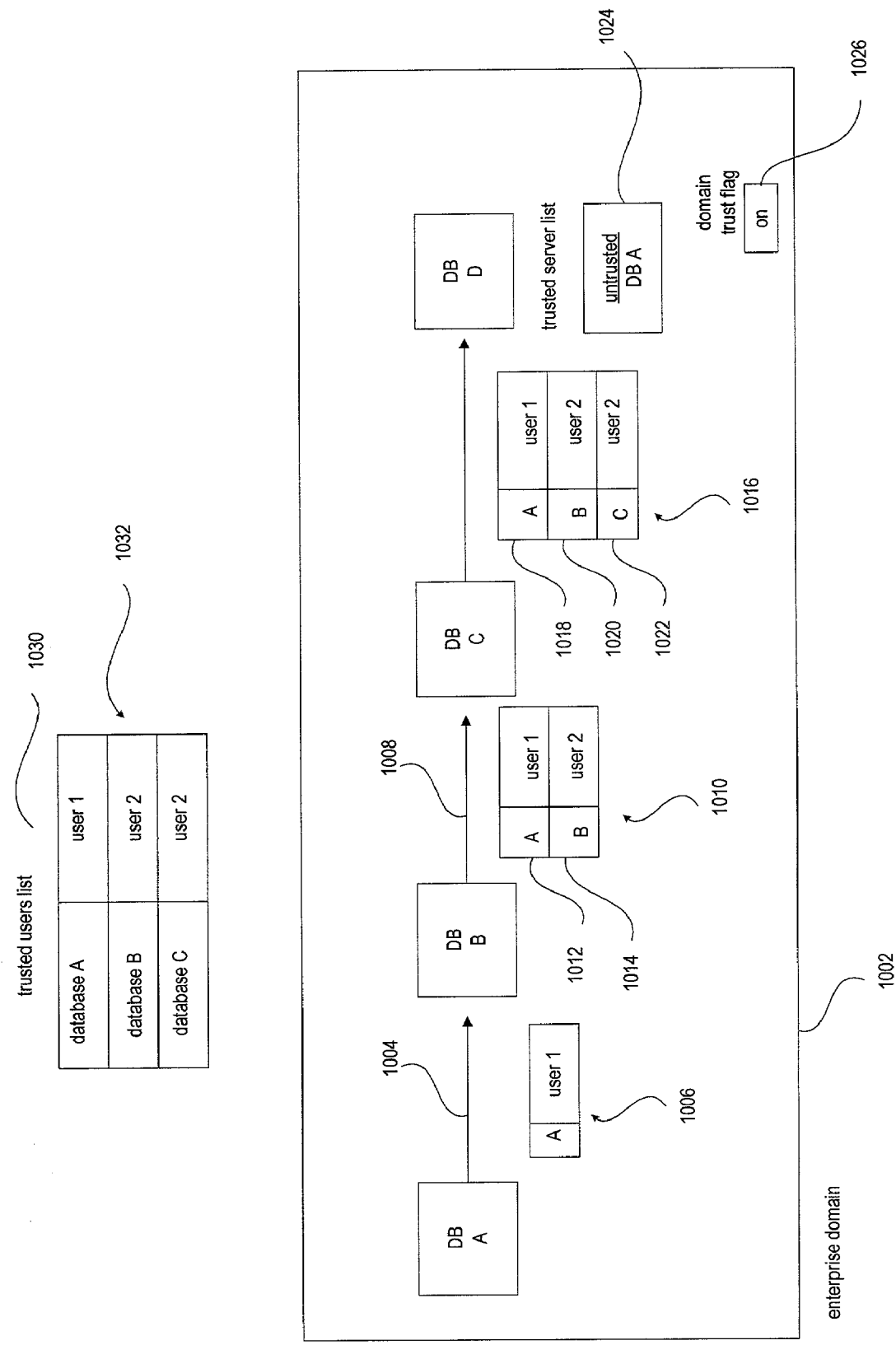
FIG. 10 shows a chain of current user links according to an embodiment of the invention.

FIG. 10 illustrates this aspect of the invention for an enterprise domain 1002. Assume that a first user ("user 1") on database A seeks to access database B. The domain trust flag 1026 is set "on", allowing current user links to be established between databases in enterprise domain 1002. When establishing a current user link from database A to database B, information 1006 is provided indicating all prior <database, user> pairs previously encountered in the current user link chain. Since this is the first current user link in the chain, only the identity of database A and its associated user are provided in information element 1006. Assume that user 1 on database B executes a procedure, owned by a second user ("user 2"), that seeks to perform an operation on database C. When establishing a current user link from database B to database C, information 1010 is provided indicating all prior <database, user> pairs previously encountered in the current user link chain. Here, both the <database A, user 1> pair 1012 and the <database B, user 2> pair 1014 are identified in information element 1010. Further assume that the executed procedure on database C requires an operation to be performed on database D. When establishing a current user link from database C to database D, information 1016 is provided indicating all prior <database,user> pairs previously encountered in the current user link chain. Here, the <database A, user 1> pair 1012, the <database B, user 2> pair 1014, and the <database C, user 2> pair 1022 are identified in information element 1016.

By supplying the entire history of <database, user> pairs in the chain of current user links, any database server in the chain can examine that information to determine whether any untrusted servers appear on that list and take actions appropriate for that situation. For example, note that database D in FIG. 10 includes a local trusted servers list 1024 that lists database A as an untrusted server. Before database D permits a current user link from database C, it will examine the information element 1016 for the chain of current user links to determine if any untrusted servers appear in that list. Since database A appears in the information list 1016 (as <database, user> pair 1018), database D will reject the current user link from database C, even though database C does not itself appear in database D's local trusted servers list 1024 as an untrusted server.

In addition to untrusted servers, current user links may be rejected based upon untrusted users that appear in the chain of current user links. That a particular <database_n,user_n> pair is trusted means that database_n is trusted to connect to another database via current user link, without the user's credentials, as user_n. One or more lists may be established to indicate that databases in the domain are to trust or not trust certain users when establishing current user links, thereby forming a trusted users list 1030. Note that the trusted users list 1030 may be implemented by adding user information to the trusted servers list(s) (such that the trusted users list is the same list as the trusted servers list, central or local, but with information regarding trusted/untrusted users), or may be implemented as an entirely different list depending upon the particular use to which the invention is directed. In an embodiment, the trusted users list is configured to indicate that servers in the domain are trusted to connect only as particular global users and the member databases can be configured to trust no more than what is indicated by the trusted users list. The trusted users list 1030 may include a central membership list 1032 that is the set of <database, user> pairs that can be trusted by other database members in an enterprise domain. Separate trusted users lists can also be maintained locally at the database servers (either as part of or separate from the local trusted servers list), or a combination of local lists and a centrally maintained list can be used to screen attempts to establish current user links.

If it is desired to only check server identities in the prior chain of links without regard to prior users in the chain, then the trusted servers list(s) are used without listing trusted/untrusted users. If it is desired to check user identities before allowing a current user link, then the trusted users list (whether separate or part of the trusted servers list) is employed to list trusted or untrusted users.

An additional mechanism that a group of databases can use to increase security and to eliminate threats introduced by transitivity is to enforce isolationism. For example, if databases A, B, C, and D wish to ensure that they will not accept any link strings that have passed through other untrusted databases, all these databases can all agree to only accept current user links from each other. Databases A, B, C, and D will, in effect, become isolated from the rest of the enterprise domain, thereby eliminating potential transitivity problems. In a sense, these databases will have formed their own sub-domain. Similarly, if all databases in the enterprise domain agree that a particular database X is not to be trusted, then all the databases can designate this in their local trusted servers list. Regardless of what is listed for Database X at the trusted users list, Database X will effectively be isolated from the rest of the domain.

The following are examples of maintenance operations for the trusted servers list:

Allow All: This operation configures the trusted servers list to indicate that the local database should abide by the information about trusted <database, user> pairs listed at the trusted users list at the time the current user link is executed. In an embodiment, this operation is implemented by deleting all entries in the trusted server table, and then adding an "ALLOW ALL" identifier.

Deny All: This operation configures the trusted servers list to indicate that no other databases are to be trusted to connect via current user links, regardless of what is listed at the trusted users list. In an embodiment, this operation is implemented by deleting all entries in the trusted servers list table, and then adding a "DENY ALL" identifier.

Allow DB: This operation configures the trusted servers list to allow a specific database to connect via current user link as any user listed with that database in a <database, user> pair at the trusted users list. In an embodiment, this operation is implemented according to the following: If there is an "ALLOW ALL" in the table, and no "DENY <db>" for a particular database "db", then fail with error message "Database <db> already allowed by ALLOW ALL"; If there is an "ALLOW ALL" in the table, and a "DENY <db>", then delete the "DENY <db>"; If there is a "DENY ALL" in the table, and no "ALLOW <db>", then add "ALLOW <db>"; If there is a "DENY ALL" in the table, and an "ALLOW <db>", then fail with error "Database <db> already allowed by an existing "ALLOW <db>".

Deny DB: This operation configures the trusted servers list to prohibit a specific database from connecting via a current user link as any user. According to an embodiment, this operation is implemented according to the following: If there is a "DENY ALL" in the table, and no "ALLOW <db>" for a particular database "db", then fail with error message "Database <db> already denied by DENY ALL"; If there is a "DENY ALL" in the table, and an "ALLOW <db>", then delete the "ALLOW <db>"; If there is an "ALLOW ALL" in the table, and no "DENY <db>", then add "DENY <db>"; If there is an "ALLOW ALL" in the table, and a "DENY <db>", then fail with error "Database <db> already denied by an existing "DENY <db>".

Check list (db_name): This operation determines whether a database <db> is trusted. In an embodiment, this operation is implemented as follows: If there is an "ALLOW ALL" in the table, and no "DENY <db>", then return TRUE; If there is a "DENY ALL" in the table, and an "ALLOW <db>", then return TRUE; If there is an "ALLOW ALL" in the table, and a "DENY <db>", then return FALSE; If there is a "DENY ALL" in the table, and no "ALLOW <db>", then return FALSE.

According to an embodiment, the default trusted servers list includes one entry at database creation to designate all other databases in the domain as trusted ("Allow All"). This default state results in the database trusting exactly those <database, user> pairs listed at the trusted users list, if the trusted users list is being used. If any database performs an Allow All operation, the database reverts to this trust situation. The local database may wish to obtain a list of the current members of the domain, and/or which users they are trusted to connect as.

Each database may modify the trusted servers list to indicate that certain databases are to be trusted or not trusted, or that all or none are to be trusted. If a database sets its local trusted servers list to trust no other databases ("Deny All"), no other databases will be permitted to connect via current user links, regardless of the settings in the trusted users list. If the local database performs a local Deny All operation, and then subsequently wishes to trust a specific database DBx, then the database DBx will be added as a trusted database to the local trusted servers list ("Allow DBx" operation). A later "Deny DBx" operation will simply reverse the effects of a specific "Allow DBx", and a later "Deny All" operation will reverse all previous "Allow DBxs" operations, e.g., by making the appropriate entries in the trusted servers list. Similarly, if the local database performed an "Allow All" operation, and subsequently wishes to deny current user links from a specific database, the trusted servers list can be modified to do so.

The effect of the trusted servers list is to potentially reduce the list of allowed connections from that permitted by the trusted users list. In the present embodiment, if the trusted servers list includes entries that are not listed at the trusted users list, those entries have no effect. However, a local database may wish to include entries for databases that are considered especially threatening, even if not listed at the trusted users list, to avoid a temporary security risk in the situation where the database suddenly becomes centrally trusted by the trusted users list. This could be done by performing an "Allow All" operation, and then listing that particular database as untrusted. If the local database wishes to be extra careful and prevent access by any database that might be added without its knowledge to the trusted users list, could have to be accomplished by performing a "Deny All" operation, and then Allowing the exact list of databases specifically intended to be trusted.

According to an embodiment, current user links are implemented based upon the current user being a global enterprise user with accounts on both databases involved. The accounts can be either unique or shared accounts. Since the remote database allows a connection for the claimed global user without proof of identity, it must trust that the request is valid—that is, the calling user has been properly authenticated by the first database, the calling user has legitimate access to the link, and that the link itself is legitimate. In an embodiment, the database should therefore verify that the originator of the link is in fact a database server, and not a client. In addition, the originating database should trust the remote database before connecting as the specified user, since commands may be executed back on the originating database by the remote database, via the link. This means that the two databases should mutually authenticate whenever a current user link is opened. In this approach, if mutual authentication fails then the link fails. Alternatively, one-way authentication between database servers may be employed if desired.

In addition to verifying that the other database is a server in the domain, the database receiving the connection request via a current user link ensures that the database originating the current user link is trusted to connect as the particular global user involved. This determination of trust occurs in two steps: first the database ensures that the originating database is listed at the trusted users list as being trusted to connect as that user, and second that the originating database is not listed locally in the trusted servers list as not to be trusted. If the <database, user> pair is determined to be trusted, that implies that the originating database is trusted to locally administer that global user properly.

Figure 11:
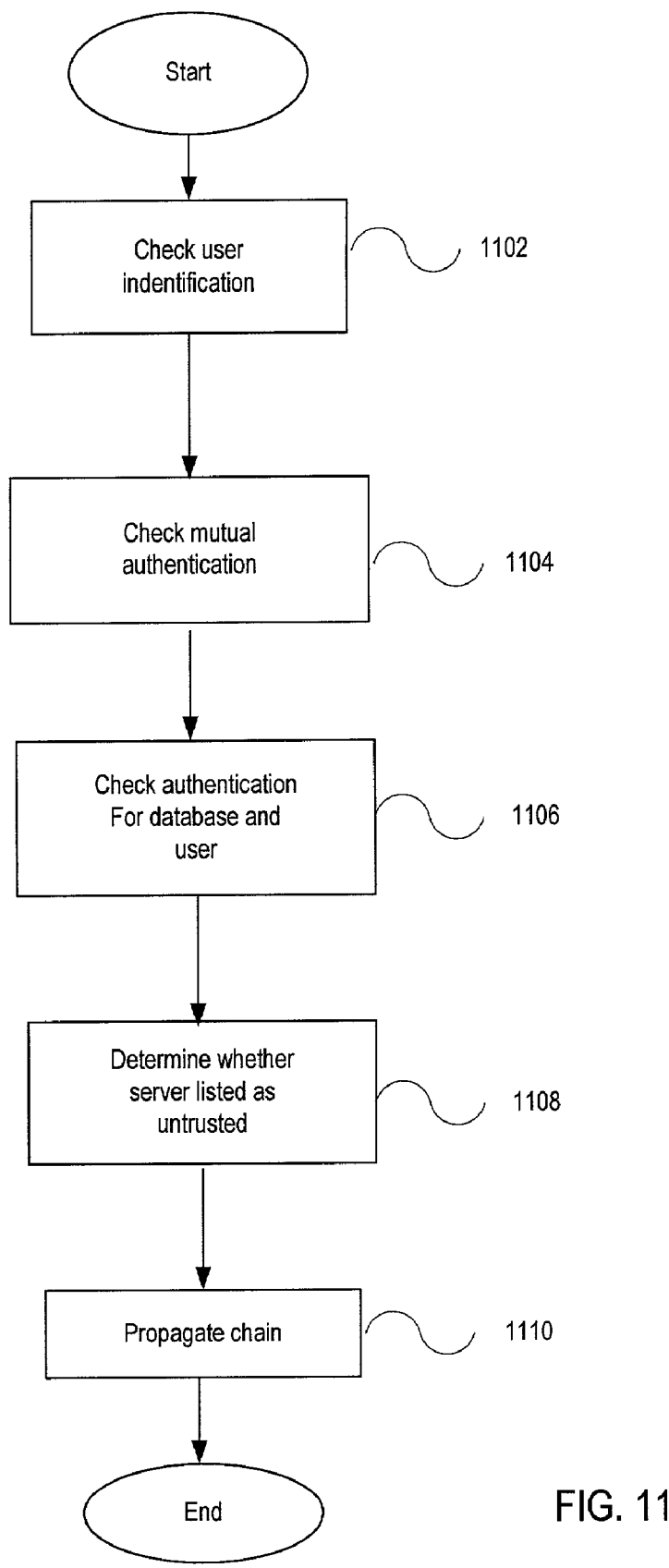
FIG. 11 is a flowchart of a process for implementing current user links according to an embodiment of the invention.

FIG. 11 shows a flowchart of a process to initiate a current user link according to an embodiment of the invention. At 1102, the process determines whether the current user is a properly created and authenticated global user on the database. At 1104, the process checks for whether mutual authentication with the remote database is successful, indicating the remote database is the expected one. The process thereafter checks that the list of authorizations for the remote database includes the current user (1106). At 1108, the process checks that the remote database is not designated as untrusted in the local trusted servers list. The process then propagates the chain stored in the session info, preferably without other changes to the remote database while the connection is being attempted (1110).

Figure 12:
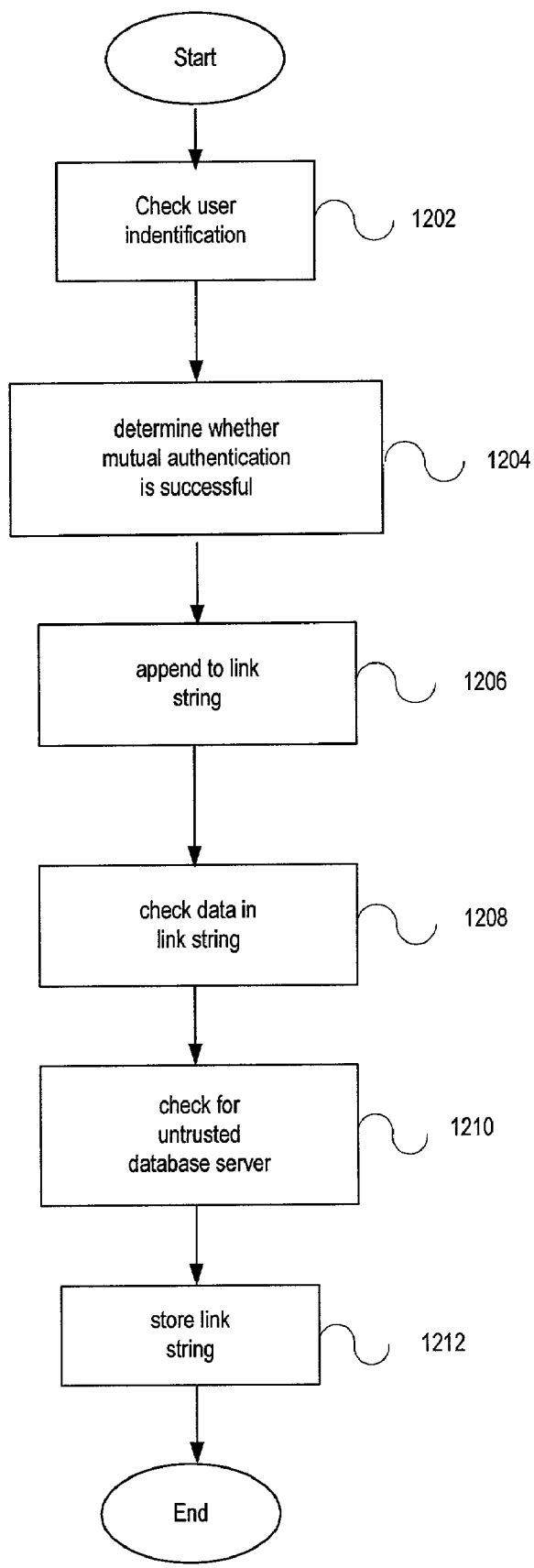
FIG. 12 shows a process for passing information relating to a chain of current user links according to an embodiment of the invention.

FIG. 12 shows a flowchart of a process for accepting a connection from a current user link. At 1202, the process checks that the user is a properly created and authenticated global user on the database with appropriate privileges. At 1204, the process determines whether mutual authentication with the originating database is successful, indicating that the remote database is the same as that indicated by the last member of the chain. The process then adds the relevant pair <database, user> to the link chain information string (which may be empty), and stores the updated chain in the session data (1206). The last <database, user> pair in the link chain is checked to determine whether it is listed as being authorized (e.g., as provided in the mutual authentication step) (1208). At 1210, the process checks that no database in the chain is designated as untrusted in the local trusted servers list. The process then stores the link chain such that it can be updated if necessary for subsequent current user links originating from this connection (1212).

According to an embodiment, only the last <database, user> entry in the link chain is locally checked for trust-authorization by the trusted users list. This is because all previous entries were presumably checked by previous databases in the string of links. Since no database can trust more than the trusted users list indicates in the present embodiment, it can be assumed that all entries in the chain, except possibly the last, are listed as trusted at the trusted users list. All that remains is to check the last entry.

The present invention also provides sufficient audit information to trace current user links back to the originating connected user. Maintaining a link chain of <database,user> entries facilitates auditing of user activities, since the link information allows actions performed at one database to be traced. In effect, the links are traceable backwards first to the connected user on the destination database (which is the current user on the originating database, and then through the chain of current user links to the connected user on the originating database.

In the above description, the trusted servers list only included a listing of trusted and untrusted database servers. In an alternate embodiment, the local trusted servers list also includes a list of trusted and untrusted <database, user> pairs. In this alternate embodiment, the additional <database, user> pair information allows finer granularity control over the exact current user links that may be established to the database.

Authentication

According to an embodiment of the invention, authentication to the directory is provided using interoperable X.509 v3 certificates over Secure Sockets Layer (SSL) v3. The following are three examples of different levels of user authentication: anonymous, password-based, and certificate-based, using the Secure Socket Layer (SSL) v3 protocol for authenticated access and data privacy.

In an embodiment, a Wallet Manager is used to manage security credentials for a user. A wallet manager is an application, preferably a standalone Java application, that wallet owners and security administrators use to manage and edit the security credentials in user wallets. The Wallet Manager provides a way to manage (request, store, and view) wallets. It creates keys and manages credential preferences for a user. A wallet contains a certificate, encrypted private key, and trust points for the user, and possibly other combinations of security credentials. The entire wallet should also be encrypted. Examples of Wallet Manager tasks include:

o Generating a public/private key pair
o Creating a certificate request
o Installing a certificate for the entity
o Configuring trusted certificates for the entity
o Creating a wallet that can be opened later
o Opening a wallet to enable access to PKI-based services A login interface mechanism is employed to open and close a user wallet in order to enable or disable secure SSL-based communications for an application. The login interface mechanism preferably enables a user to log on to applications automatically. This tool is preferably a functional subset of the Wallet manager. The login interface mechanism preferably masks the complexity of SSL, wallets, enterprise users, and the process of authenticating to multiple databases. The login interface mechanism should let users access multiple databases and applications using a single password, entered only once per session, and provides the subset of the wallet manager functionality for opening a user wallet and enabling applications to use the open wallet to automatically authenticate a user.

LDAP Integration

The present invention may be employed with any type of LDAP directory. For the purposes of illustration, the present invention is described with respect to an LDAP directory implemented using a relational database management system ("RDBMS"). This section describes methods and mechanisms for integrating a RDBMS with LDAP directory structures.

Figure 13:
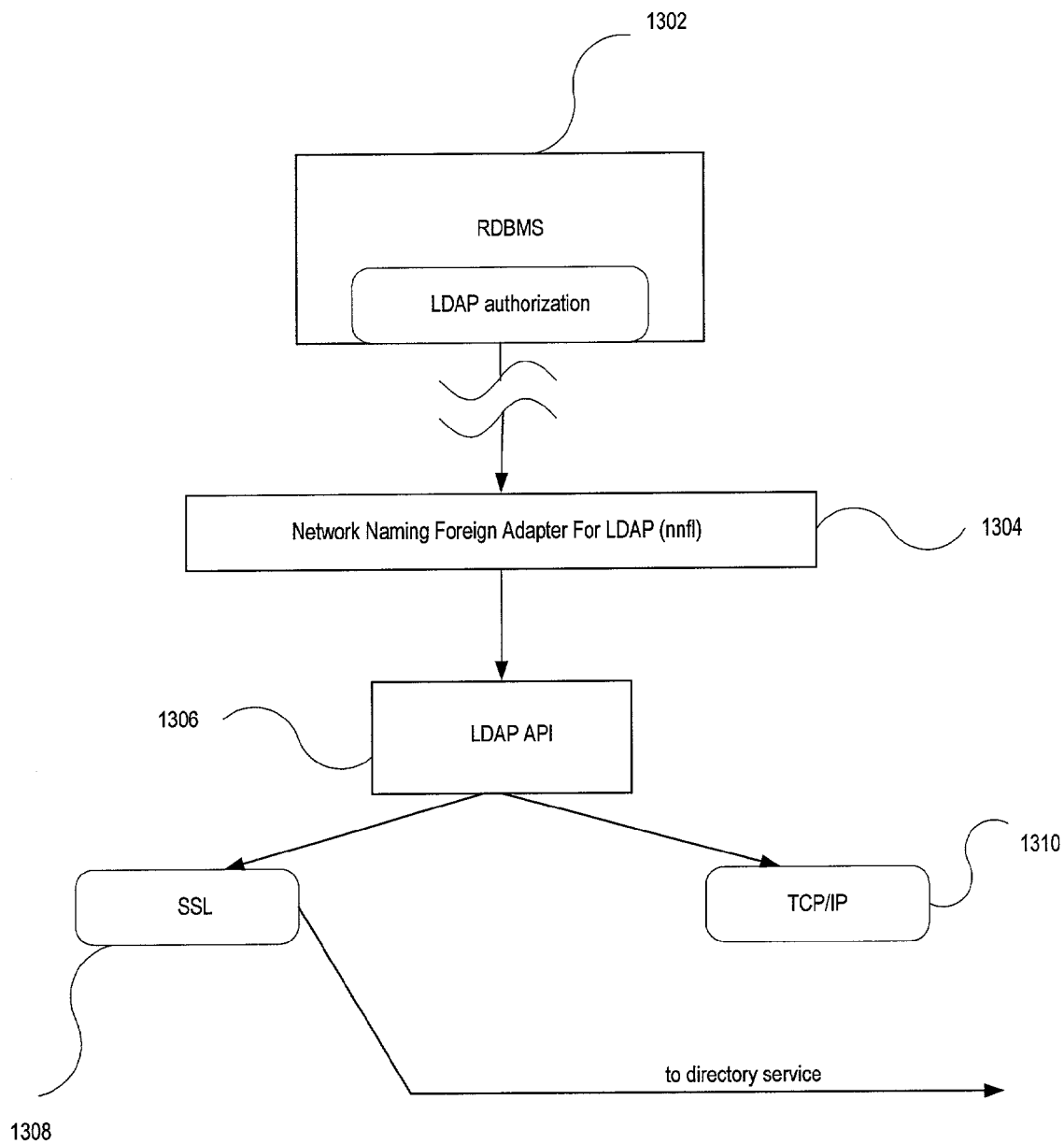
FIGS. 13 and 14 represent architecture for integrating an RDBMS with a LDAP directory.

FIG. 13 depicts an architectural overview of an embodiment of this aspect of the invention. The RDBMS 1302 is communicatively coupled to a Network Naming Adapter for LDAP ("NNFL") 1304. The NNFL 1304 performs the operations of locating the directory service, performing connection management, and communicating with the Directory Service via LDAP APIs 1306. User and server authorization information are retrieved from the schema at the Directory Service by making calls to the LDAP APIs 1306 via NNFL 1304. In an alternate embodiment, information is communicated between the RDBMS 1302 and the LDAP API without using a NNFL layer 1304.

The LDAP APIs open LDAP connections to the Directory Service to obtain the information. In one embodiment, the LDAP API 1306 uses SSL 1308 instead of TCP/IP 1310 for sending LDAP messages to an enterprise directory service. Alternatively, TCP/IP 1310 is employed instead of SSL 1308. According to an embodiment of the invention, standard LDAP schemas are extended to include additional role and server information. For example, Enterprise roles will be added as objects, along with mechanisms to store the roles allocated to a global user.

Figure 14:
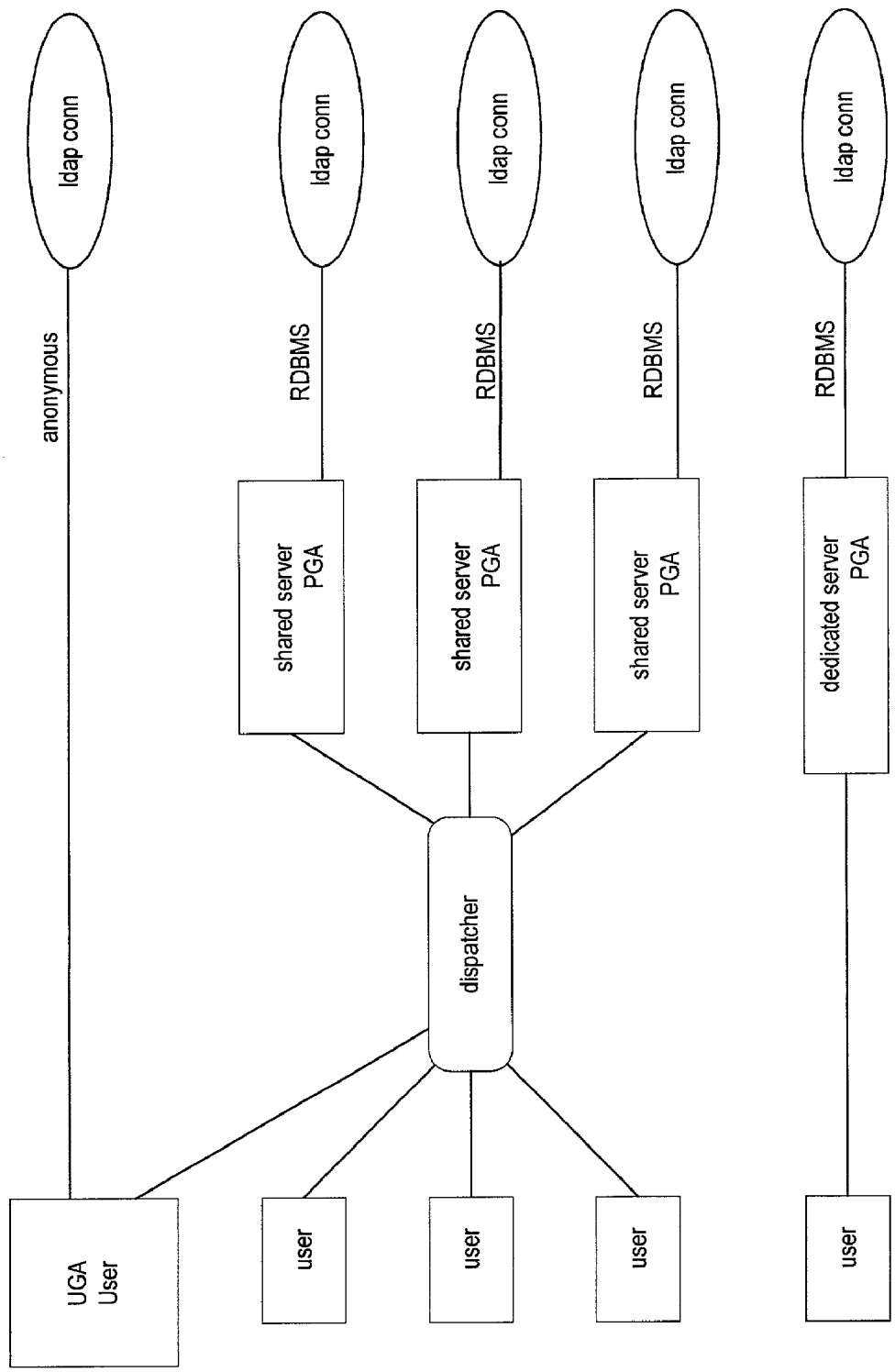

Referring to FIG. 14, LDAP connections are managed according to various factors. In an embodiment, each shared or dedicated server will employ their own LDAP connections, and there will be no sharing of LDAP connections between servers. In an embodiment, each server will have one LDAP connection that has been authenticated at the Directory Server as the RDBMS, and one or more anonymous connections initiated by applications. Authentication for RDBMS-authenticated LDAP connections is preferably certificate-based strong authentication.

For an RDBMS-authenticated connection using a shared server, the RDBMS will open (bind) the RDBMS-LDAP connection the first time it is needed (either authorizing a user or another server), and will leave it open, according to an embodiment. The connection context will be stored in memory buffer that contains data and control information for a server process ("PGA") for future use by the server. Future calls from the RDBMS to LDAP will use this connection if it still exists. If not, a new connection will be opened. The connection will be closed (unbind) upon shutdown of that server. No LDAP requests from applications will be routed to these RDBMS-LDAP connections. For a dedicated server, an RDBMS-LDAP connection will be opened each time it is needed, and closed immediately thereafter.

For both shared and dedicated servers, anonymous connections will be opened and closed upon request by applications, and the connection context will be in a system memory region that contains data and control information ("UGA"). In this manner, it will be available for use regardless of which shared server the application is routed to.

In an alternate embodiment, connections are shared between servers, similarly to shared database links, with the connection context stored in a shared memory region for a database instance ("SGA") and connections maintained by a background process such as a dispatcher process. Using shared connections between servers may involve increased overhead, e.g., due to context switches.

In an embodiment, all LDAP calls are made in synchronous (blocking) mode, so the server will block until the LDAP query results are available. Since there are other shared servers which can process other user's requests, the overall system response time will not be adversely affected. LDAP calls in an embodiment are calls to the NNFL layer. NNFL, as mentioned previously, will in turn call the LDAP API. Non-cached information will be requested from NNFL. The NNFL layer handles referrals transparently to the RDBMS.

Figure 15:
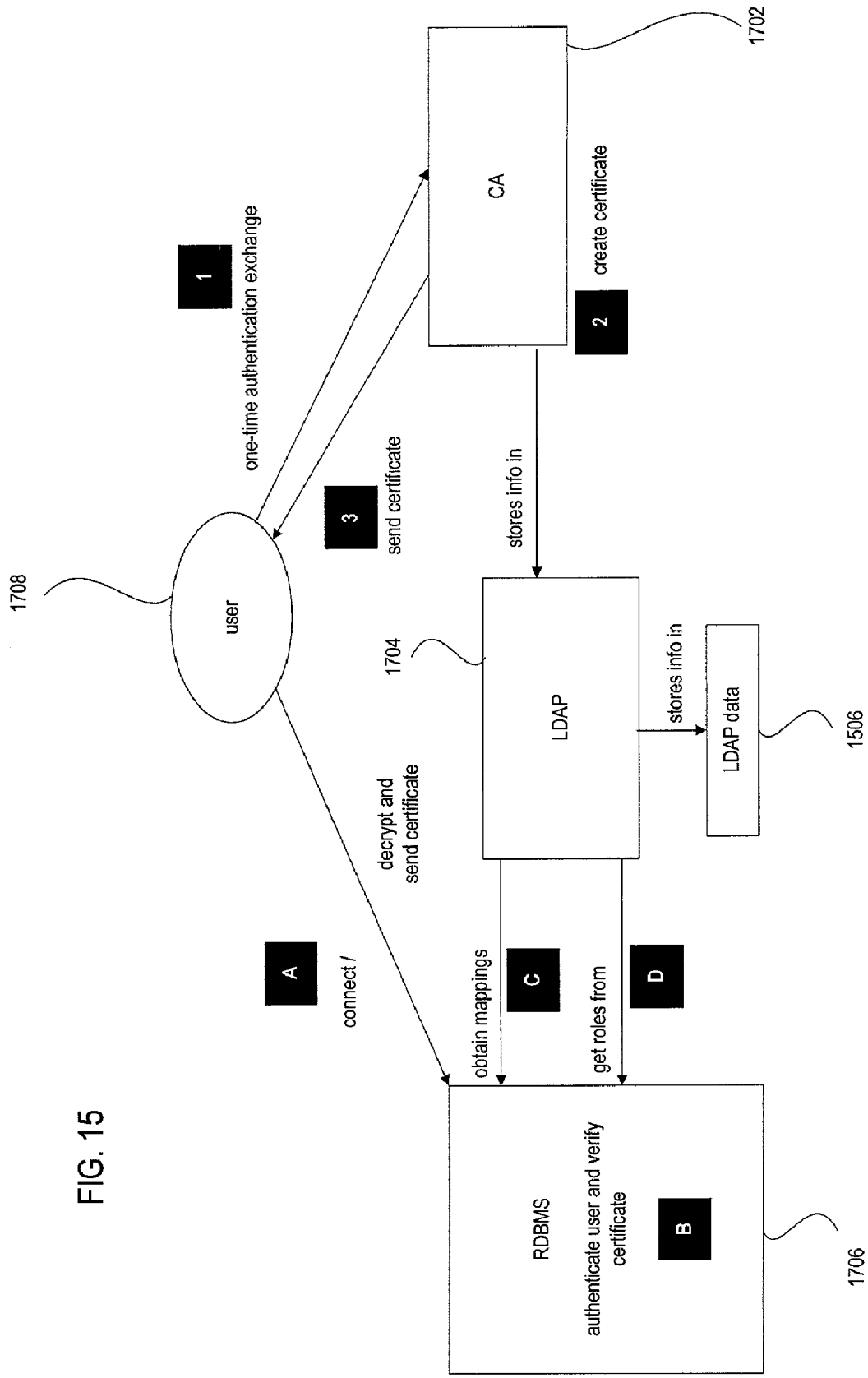
FIG. 15 represents architecture and process flows for integrating RDBMS and a LDAP directory for user access, control and/or authentication, according to an embodiment of the invention.

FIG. 15 depicts a system diagram of an architecture for LDAP authentication according to an embodiment of the invention. In the approach shown in FIG. 15, LDAP data 1506 is stored in a RDBMS 1706. A certificate authority ("CA") 1702 provides certificates for authentication of global users and for mutual authentication between servers. Any suitable CA may be employed in embodiments of the invention, including CA products available from Microsoft Corporation (Microsoft CA) or Oracle Corporation (OCA). An LDAP directory service 1704 acts as a functional intermediary between the CA 1702 and the LDAP information repository 1506. Any suitable LDAP directory service may be employed in the invention, such as the Oracle Internet Directory (OID) product, available from Oracle Corporation of Redwood Shores, Calif.

Steps 1–3 in FIG. 15 describe the process for generating authentication information or a user 1708. The user 1708 is created as an object at the directory 1704, e.g., with an X.509-compliant username. Then, the user 1708 requests and obtains a certificate from an appropriate CA. When the user 1708 obtains a certificate, that user is preferably authenticated in some out-of-band way (e.g., fingerprint, social security card, etc.). After passing the registration process, a wallet is created on the user's client machine. The wallet includes the repository location, the trustpoints (e.g., the legitimate repository's certificate), and the user's encrypted private key and his certificate. The user's certificate contains the user's ID and public key, and is cryptographically signed by the certificate authority 1702. In an alternate embodiment, the user authentication and wallet information can also be stored at the LDAP directory 1704/1506.

The database server 1706 is also registered via the CA 1702 (or Kerberos authority) with an X.509 name at the LDAP directory 1704. The database or DBA obtains a wallet with a certificate as part of this process. Then, there is another login-like exchange via a wallet manager to open a wallet for the server 1706. This wallet contains the server's signed certificate (if certificates are used), trust points, and an encrypted private key. These items will be used in the handshake between the server 1706 and the global user 1708.

Steps A, B, and C in FIG. 15 describe actions that occur when a user 1708 attempts to connect to the database 1706. When the user attempts to connect, the user's signed certificate or Kerberos ticket is retrieved from the user's wallet and is passed, along with the connection information, to the database 1706. At the database 1706, a mutual authentication handshake is performed with the client machine to verify the identity of the user 1708 attempting to connect. As part of this handshake, if certificates are being used, the database 1706 performs a public/private key and certificate exchange with the client, and verifies that the provided certificate is a legitimate certificate signed by the correct CA 1702 by referencing the trustpoints stored in the database's wallet, and optionally validates that the certificate has not been revoked. This step confirms that the public key provided is the correct one for the user listed in the certificate. Similarly, the user's machine verifies and validates the RDBMS's certificate, and authenticates the RDBMS.

During the attach phase, before the actual login, the database 1706 obtains the user identity (e.g., from the certificate, if using certificates), and places it into the network context. At login, the RDBMS extracts the user's external username (e.g., the distinguished name) and public key from the network context. The RDBMS looks up the global user locally and in the directory to find an associated schema name. The database 1706 then retrieves the user's global roles from the LDAP directory. The database 1706 also performs schema mappings for the user 1708.

An embodiment of the invention utilizes a LDAP Directory Service Monitor process (LDMON), which is an RDBMS server process. In an embodiment, the LDMON opens two connections via the LDAP API to the LDAP server at database startup, and maintains and manages a pool of open connections for use by the RDBMS and applications/users. LDMON opens connections by making an LDAP API call to send a standard LDAPv3 BindRequest call to the LDAP server, authenticating as the database or as the application or user that requested it. LDMON closes connections by making an UnbindRequest API call.

In an embodiment, the calling stack is as follows: the API or RDBMS internals indirectly or directly call LDMON, which pools connections and calls the LDAP API through the NNFL, which produces LDAPv3 requests and sends them via SSL. Alternatively, the calls to the LDAP API are not made through an NNFL. In an embodiment, the LDAP API has no knowledge of the underlying schema at LDAP, and just sends the requested LDAP messages. However, the RDBMS does know about the schema, and thus can determine what sort of LDAP search requests to send.

LDMON functionality depends on the type of connection requested. For internal RDBMS calls to LDMON, the request will preferably be put on a queue of requests waiting for an RDBMS-authenticated connection. The requests on the queue are processed in a FIFO manner, with time-outs to determine if a connection is no longer needed. If the queue gets too long, and the number of open connections will be at or below a maximum limit, a new RDBMS-authenticated LDAP connection can be opened. Note that internal RDBMS calls to LDMON and should not include the bindRequest and unbindRequest calls, since it can be assumed that LDMON is managing the opening and closing of properly authenticated connections.

For calls from applications or users requesting anonymous connections, the request will preferably be put on a second queue of requests waiting for an anonymous connection. As above, the requests on the queue are processed in a FIFO manner, with time-outs to determine if a connection is no longer needed. If this queue gets too long, and the number of open connections will be at or below a maximum limit, a new anonymous LDAP connection can be opened. Note that anonymous connection bind request calls to LDMON may not actually result in an LDAP bindRequest call, since there may be available anonymous connections already open. Similarly, unbind request calls may not actually drop the anonymous connection.

In an embodiment, the difference between anonymous connections and the RDBMS-authenticated connections are that anonymous connections are only created as needed, whereas two RDBMS-authenticated connections are always kept open. Also, these anonymous connections are available to any caller, whereas the RDBMS-authenticated connections are only available internally to the RDBMS. The main similarity is that both types of connections are shared between callers, and are not locked for any caller. LDMON routes the LDAP responses to the relevant requestor.

For requests from applications or users for a specially authenticated LDAP connection, the user requests a connection to the LDAP server by calling a bind to LPMON. If the number of open connections will be at or below a maximum limit, LDMON attempts to open an appropriately authenticated connection to the LDAP server for that user. If successful, LDMON assigns the connection to the user, and returns a connection identifier. Future LDAP requests from this user refer to this connection identifier. If the number of open connections would be above the maximum limit, the request is put in the request queue. When an entity drops a LDMON connection, or an anonymous or RDBMS-authenticated connection (other than any mandatory connections that must remain open) times out, the connection request queue is checked, and a new connection is opened and authenticated appropriately for the first entry in the queue.

According to an embodiment, the LDMON process includes the following characteristics: LDMON maintains at least two open connections from the RDBMS to the LDAP server; LDMON uses the LDAP API to communicate with the LDAP server; the LDAP API communicates to LDAP via standard LDAPv3 calls; the LDAP API communicates to LDAP in a secure fashion via SSL; LDMON ensures that no non-RDBMS process (such as an application or database user) places information on RDBMS-authenticated connections; if requested, LDMON opens an authenticated connection in the name provided by an application, and ensure that no other process places information on that connection; if the RDBMS requests a connection, and no RDBMS-authenticated connection is currently available (i.e., less than X entries in the queue for that connection), LDMON attempts to open a new appropriately authenticated connection, up to a maximum specified number; if an application requests a connection, LDMON attempts to open a new appropriately authenticated connection, up to a specified maximum number; If the maximum number of connections has been reached, so that bind requests have to wait, those callers specifying WAIT will be queued up and allocated connections as they become available on a first-come, first-served basis; LDMON returns an error to the caller if the caller has specified NOWAIT, if the maximum number of connections has been reached and no appropriately authentication connection is currently available; LDMON ensures that connections bound by applications or users are actually being used, possibly via a time-out mechanism; LDMON cleans up dropped connections; LDMON attempts to reopen at least two RDBMS connections if the LDAP server crashes and/or reboots; LDMON will preferably return error messages to clients or applications that had a connection locked at the time of the crash.

The following are additional functional characteristics according to an embodiment for the LDAP server. When opening a new connection to the LDAP server as the RDBMS, the RDBMS preferably mutually authenticates with the LDAP server in a secure way such that another entity cannot masquerade as that Oracle database server, or as the LDAP server. When opening a new connection to the LDAP server as an application/user entity, the RDBMS relays the entity name and password to the LDAP server. LDAP responses are reliably associated with the correct LDAP requests for that LDAP connection, even if requests and/or responses are processed asynchronously. LDAP requests and responses are reliably stored by the RDBMS until they can be sent to LDAP or back to the requesting entity. User and server authorization information retrieved from LDAP are cached at the RDBMS up to a specified time limit. LDMON retrieves fresh information directly from LDAP, and not from the cache, if requested by the calling process. In this case, the cache is updated with non-cached information.

The following are characteristics of the LDAP API according to an embodiment of the invention: JAVA and PL/SQL LDAP APIs are available to RDBMS users and applications, and provide access to all standard LDAP functionality. APIs work with any suitable implementation of LDAP. The LDAP APIs should attempt to open an LDAP connection as anonymous or as an entity specified by the application, using the application-provided password. This may be accomplished by the application imbedding an LDAP password in a trusted stored procedure. There should be an initialization parameter that specifies the maximum allowed number of concurrent LDAP connections per application/user. The LDAP APIs should include a mechanism for the user to specify that non-cached information is to be obtained from LDAP; i.e., to indicate that cached, previously-retrieved information is not acceptable. The RDBMS should return the response from LDAP to the application that made the corresponding request. Finally, requests can specify synchronous or asynchronous responses.

System Architecture Overview

Figure 16:
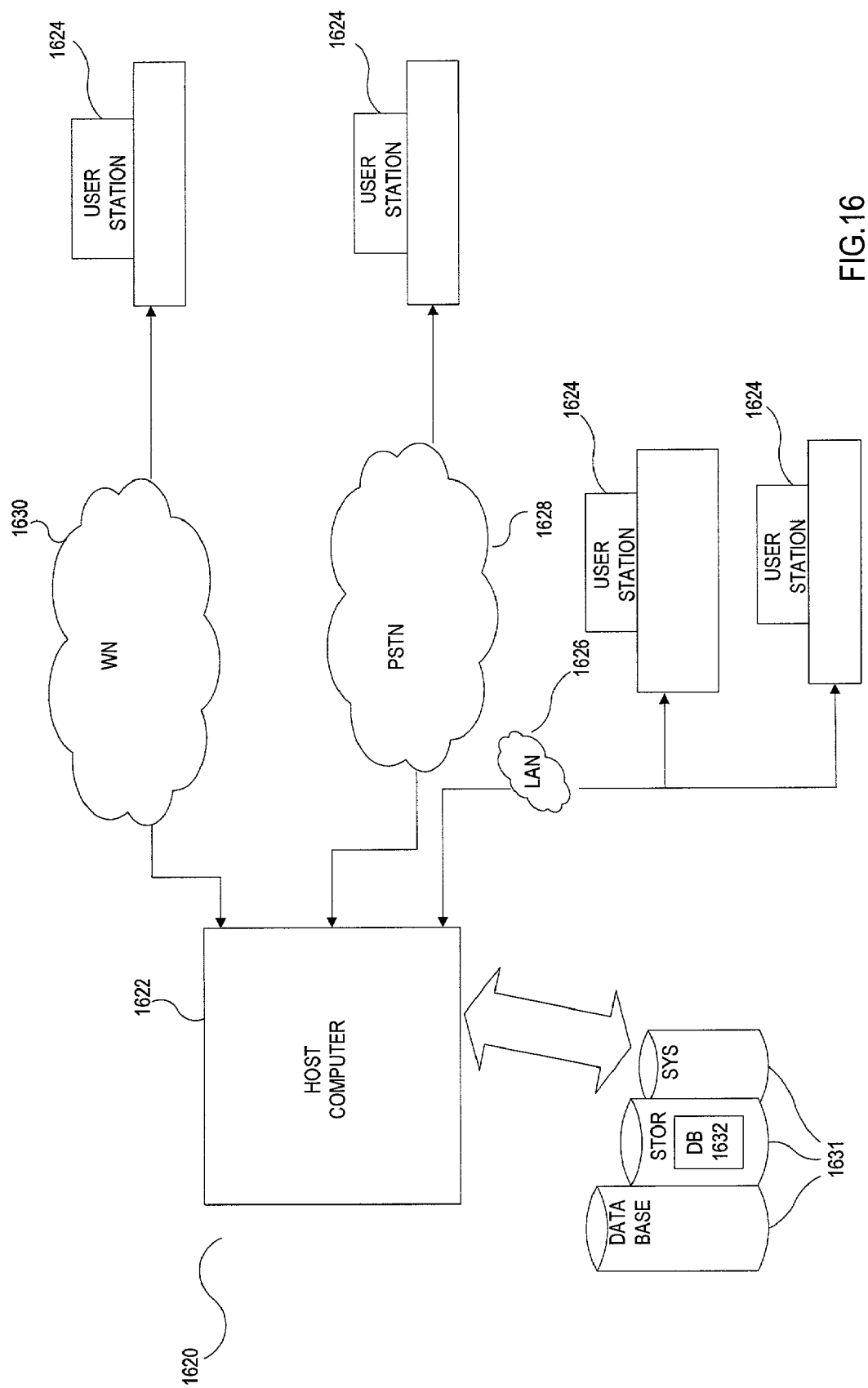
FIGS. 16 and 17 are system architectures that may be employed in an embodiment of the invention.

Referring to FIG. 16, in an embodiment, a computer system 1820 that can be used to implement the invention includes a host computer 1822 connected to a plurality of individual user stations 1824. In an embodiment, the user stations 1824 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1824 are connected to the host computer 1822 via a local area network ("LAN") 1826. Other user stations 1824 are remotely connected to the host computer 1822 via a public telephone switched network ("PSTN") 1828 and/or a wireless network 1830.

In an embodiment, the host computer 1822 operates in conjunction with a data storage system 1831, wherein the data storage system 1831 contains a database 1832 that is readily accessible by the host computer 1822. Note that a multiple tier architecture can be employed to connect user stations 1824 to a database 1832, utilizing for example, a middle application tier (not shown). In alternative embodiments, the database 1832 may be resident on the host computer, stored, e.g., in the host computer's ROM, PROM, EPROM, or any other memory chip, and/or its hard disk. In yet alternative embodiments, the database 1832 may be read by the host computer 1822 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 1822 can access two or more databases 1832, stored in a variety of mediums, as previously discussed.

Figure 17:
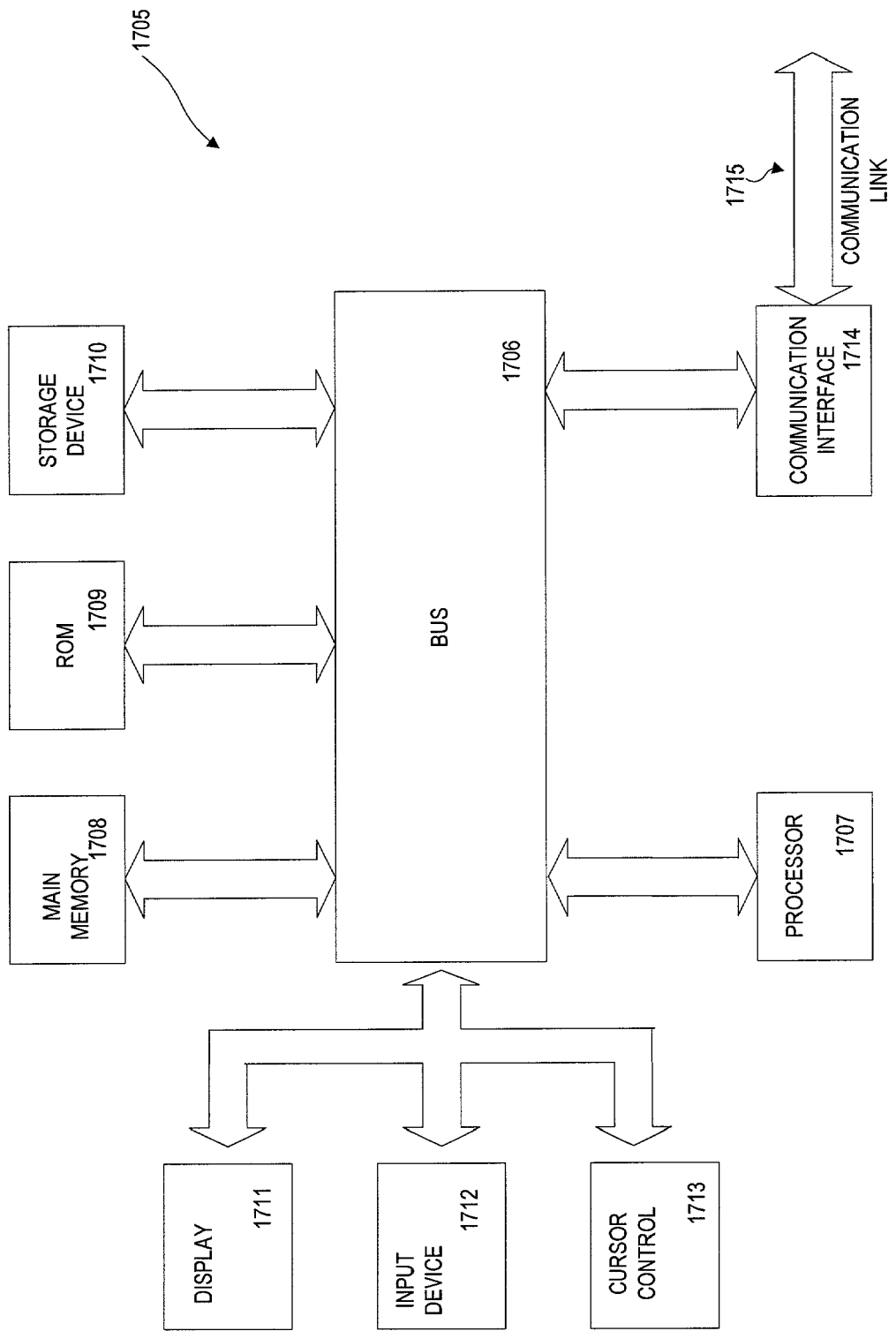

Referring to FIG. 17, in an embodiment, each user station 1824 and the host computer 1822, each referred to generally as a processing unit, embodies a general architecture 1905. A processing unit includes a bus 1906 or other communication mechanism for communicating instructions, messages and data, collectively, information, and one or more processors 1907 coupled with the bus 1906 for processing information. A processing unit also includes a main memory 1908, such as a random access memory (RAM) or other dynamic storage device, coupled to the bus 1906 for storing dynamic data and instructions to be executed by the processor(s) 1907. The main memory 1908 also may be used for storing temporary data, i.e., variables, or other intermediate information during execution of instructions by the processor(s) 1907. A processing unit may further include a read only memory (ROM) 1909 or other static storage device coupled to the bus 1906 for storing static data and instructions for the processor(s) 1907. A storage device 1910, such as a magnetic disk or optical disk, may also be provided and coupled to the bus 1906 for storing data and instructions for the processor(s) 1907.

A processing unit may be coupled via the bus 1906 to a display device 1911, such as, but not limited to, a cathode ray tube (CRT), for displaying information to a user. An input device 1912, including alphanumeric and other columns, is coupled to the bus 1906 for communicating information and command selections to the processor(s) 1907. Another type of user input device may include a cursor control 1913, such as, but not limited to, a mouse, a trackball, a fingerpad, or cursor direction columns, for communicating direction information and command selections to the processor(s) 1907 and for controlling cursor movement on the display 1911.

According to one embodiment of the invention, the individual processing units perform specific operations by their respective processor(s) 1907 executing one or more sequences of one or more instructions contained in the main memory 1908. Such instructions may be read into the main memory 1908 from another computer-usable medium, such as the ROM 1909 or the storage device 1910. Execution of the sequences of instructions contained in the main memory 1908 causes the processor(s) 1907 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1907. Such a medium may take many forms, including, but not limited to, non-volatile, volatile and transmission media. Non-volatile media, i.e., media that can retain information in the absence of power, includes the ROM 1909. Volatile media, i.e., media that can not retain information in the absence of power, includes the main memory 1908. Transmission media includes coaxial cables, copper wire and fiber optics, including the wires that comprise the bus 1906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1907 can retrieve information. Various forms of computer-usable media may be involved in providing one or more sequences of one or more instructions to the processor(s) 1907 for execution. The instructions received by the main memory 1908 may optionally be stored on the storage device 1910, either before or after their execution by the processor(s) 1907.

Each processing unit may also include a communication interface 1914 coupled to the bus 1906. The communication interface 1914 provides two-way communication between the respective user stations 1924 and the host computer 1922. The communication interface 1914 of a respective processing unit transmits and receives electrical, electromagnetic or optical signals that include data streams representing various types of information, including instructions, messages and data. A communication link 1915 links a respective user station 1924 and a host computer 1922. The communication link 1915 may be a LAN 1826, in which case the communication interface 1914 may be a LAN card. Alternatively, the communication link 1915 may be a PSTN 1828, in which case the communication interface 1914 may be an integrated services digital network (ISDN) card or a modem. Also, as a further alternative, the communication link 1915 may be a wireless network 1830. A processing unit may transmit and receive messages, data, and instructions, including program, i.e., application, code, through its respective communication link 1915 and communication interface 1914. Received program code may be executed by the respective processor(s) 1907 as it is received, and/or stored in the storage device 1910, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer-implemented method for managing user access information for access to one or more database network nodes by a user, the method comprising:
   storing database user authorization in a central directory that is associated with one or more network nodes, the database user authorization comprising a user role associated with a collection of locally defined roles and associated users, wherein the user role in the central directory assigns user privileges to the user as defined by the locally defined roles contained within the user role, wherein the database user authorization is stored as one or more data objects in the central directory;
   storing database user authentication information;
   receiving the user role at a local database network node from the central directory;
   locally defining, by using a processor, a locally defined role for assigning the user privileges specific to a local database network node for a local scope of access at the local database network node, wherein the locally defined role is locally defined by processing at the local database network node the user role that is received from the central directory, and the user privileges granted by the locally defined role are given to the user based at least in part upon the user's association with the user role such that the locally defined role has a different scope of access than another locally defined role defined by processing the same user role at another local database network node;
   receiving an access request from the user for the local database network node;
   authenticating the user using a shared schema based at least in part upon the database user authentication information, wherein the shared schema comprises a schema that is accessible by a plurality of users and the plurality of users are mapped to the shared schema on the local database network node such that the plurality of users do not need their own accounts on the local database network node;
   granting the user privileges on the local database network node based at least in part upon the shared schema and the locally defined role; and
   storing the user privileges in a volatile or non-volatile computer-usable medium or displaying the user privileges on a display device.

2. The method of claim 1 in which the central directory comprises a LDAP-compatible directory.

3. The method of claim 1 in which the database user authentication information is stored at the central directory.

4. The method of claim 1 in which the database user authorization is stored in a schema having a hierarchy of schema objects.

5. The method of claim 4 in which the hierarchy of schema objects comprises an enterprise role, wherein the enterprise role is associated with one or more users and one or more locally defined roles.

6. The method of claim 5 in which the one or more privileges are assigned to the one or more users.

7. The method of claim 4 in which the hierarchy of schema objects comprises a enterprise domain, wherein the enterprise domain comprises one or more enterprise roles.

8. The method of claim 7 in which each of the one or more enterprise roles is associated with one or more users and one or more locally defined roles.

9. The method of claim 7 in which the enterprise domain is associated with one or more network nodes.

10. The method of claim 1 in which the one or more objects are stored in a security subtree in the central directory.

11. The method of claim 1 in which administrative access is controlled to one or more data objects in the central directory.

12. The method of claim 11 in which access control is implemented using an access control point associated with the one or more data objects in the central directory.

13. The method of claim 12 in which the access control point is associated with access policies for a subtree of the one or more database objects in the central directory.

14. The method of claim 12 in which the access control point is associated with access policies for a single entry for the one or more database objects in the central directory.

15. The method of claim 12 in which the access control point is associated with individually named users.

16. The method of claim 12 in which the access control point is associated with a group of users.

17. The method of claim 16 in which members of the group are associated with a set of access privileges associated with the access control point.

18. The method of claim 1, wherein one of the one or more data objects comprises a distinguished name, wherein the distinguished name comprises a common name having a value for identifying a database.

19. The method of claim 1, wherein one of the one or more data objects comprises a distinguished name, wherein the distinguished name comprises a common name having a value for representing an administrative context, a root context, or a user-fined context.

20. The method of claim 1, wherein the one or more privileges are locally defined at the one of the network nodes.

21. The method of claim 20, wherein the database user authorization is stored in the central directory such that central management of the user role may be performed.

22. The method of claim 20, wherein the one or more privileges are not centrally defined at the central directory.

23. A computer system including a processor for managing user access information for access to one or more database network nodes by an enterprise user, comprising:
   a LDAP directory;
   one or more local database network nodes for which user access is sought, wherein the one or more local database network nodes are associated with the LDAP directory;
   a volatile or non-volatile computer-usable medium for storing user access information data objects in the LDAP directory, the user access information data objects comprising authentication and authorization information, wherein the authorization information comprises an enterprise role associated with a collection of locally defined roles and associated users, wherein the enterprise role in the LDAP directory assigns user privileges to the enterprise user as defined by the locally defined roles contained within the enterprise role; and
   the processor for locally defining a locally defined role for assigning the user privileges specific to a local database network node for a local scope of access at the local database network node, wherein the locally defined role is locally defined by processing at the local database network node the enterprise role that is received from the LDAP directory, and the user privileges granted by the locally defined role are given to the enterprise user based at least in part upon the enterprise user's association with the enterprise role such that the locally defined role has a different scope of access than another locally defined role defined by processing the same enterprise role at another local database network node.

24. The system of claim 23 in which the user access information data objects comprise a domain object that is associated with the one or more database network nodes.

25. The system of claim 24 in which the domain object is associated with the enterprise role.

26. The system of claim 25 in which the enterprise role is associated with a local database role.

27. The system of claim 26 in which the scope of the local database role is locally defined at a local database network node.

28. The system of claim 25 in which the enterprise role is associated with another user.

29. The system of claim 25 in which the enterprise role is associated with local database roles from a plurality of database nodes.

30. The system of claim 23 in which the user access information data objects comprise an access control point attribute.

31. The system of claim 30 in which the access control point attribute is established only if access control polices are established for a corresponding object.

32. The system of claim 30 in which the access control point attribute is associated with access policies for a subtree in the user access information data objects stored in the LDAP directory.

33. The system of claim 30 in which the access control point attribute is associated with access policies for a single entry in the user access information data objects stored in the LDAP directory.

34. The system of claim 30 in which the access control point attribute is associated with individually named users.

35. The system of claim 30 in which the access control point attribute is associated with a group of users.

36. The system of claim 35 in which members of the group are associated with a set of access privileges associated with the access control.

37. The system of claim 23 in which the users access information data objects comprise a mapping object that maps an database user to a database schema.

38. The system of claim 37 in which the mapping object affects a single user.

39. The system of claim 38 in which the mapping object is associated with a full distinguished name.

40. The system of claim 37 in which the mapping object is associated with a plurality of users.

41. The system of clam 38 in which the mapping object is associated with a partial distinguished name.

42. A computer program product that includes a volatile or non-volatile non-transitory computer-usable medium usable by a processor, the medium having stored thereon a sequence of instructions which, when executed by said processor, causes said processor to execute a process for managing user access information for access to one or more database network nodes by a user, the process comprising:
   storing database user authorization in a central directory that is associated with one or more network nodes, the database user authorization comprising a user role associated with a collection of locally defined roles and associated users, wherein the user role in the central directory assigns user privileges to the user as defined by the locally defined roles contained within the user role, wherein the database user authorization is stored as one or more data objects in the central directory;
   storing database user authentication information;
   receiving the user role at a local database network node from the central directory;
   locally defining a locally defined role for assigning the user privileges specific to a local database network node for a local scope of access at the local database network node, wherein the locally defined role is locally defined by processing at the local database network node the user role that is received from the central directory, and the user privileges granted by the locally defined role are given to the user based at least in part upon the user's association with the user role such that the locally defined role has a different scope of access than another locally defined role defined by processing the same user role at another local database network node;
   receiving an access request from the user for the local database network node;
   authenticating the user using a shared schema based at least in part upon the database user authentication information, wherein the shared schema comprises a schema that is accessible by a plurality of users and the plurality of users are mapped to the shared schema on the local database network node such that the plurality of users do not need their own accounts on the local database network node;

granting the user privileges on the local database network node based at least in part upon the shared schema and the locally defined role; and storing the user privileges or displaying the user privileges on a display device.

43. The computer program product of claim 42 in which the central directory comprises a LDAP-compatible directory.

44. The computer program product of claim 42 in which the database user authentication information is stored at the central directory.

45. The computer program product of claim 42 in which the database user authorization is stored in a schema having a hierarchy of schema objects.

46. The computer program product of claim 42 in which the one or more objects are stored in a security subtree in the central directory.

47. The computer program product of claim 42 in which administrative access is controlled to one or more data objects in the central directory.

48. The computer program product of claim 47 in which access control is implemented using an access control point associated with the one or more data objects in the central directory.

49. The computer program product of claim 48 in which the access control point is associated with access policies for a subtree of the one or more database objects in the central directory.

50. The computer program product of claim 48 in which the access control point is associated with access policies for a single entry for the one or more database objects in the central directory.

51. The computer program product of claim 48 in which the access control point is associated with individually named users.

52. The computer program product of claim 48 in which the access control point is associated with a group of users.

53. The computer program product of claim 52 in which members of the group are associated with a set of access privileges associated with the access control point.

* * * * *

UNITED STATES PATENT AND TRADEMARK OFFICE
CERTIFICATE OF CORRECTION

| | | |
|---|---|---|
| PATENT NO. | : 7,865,959 B1 | Page 1 of 1 |
| APPLICATION NO. | : 10/084880 | |
| DATED | : January 4, 2011 | |
| INVENTOR(S) | : Lewis | |

It is certified that error appears in the above-identified patent and that said Letters Patent is hereby corrected as shown below:

In column 5, line 38, delete "(EDIT")" and insert -- ("DIT") --, therefor.

In column 6, line 28, delete "c=u" and insert -- c=uk --, therefor.

In column 13, line 31, delete "aftr" and insert -- attr --, therefor.

In column 14, line 9, delete "aftr" and insert -- attr --, therefor.

In column 32, line 52-53, delete "including, but not limited to, non-volatile, volatile and transmission media." and insert -- including non-volatile and volatile media. --, therefor.

In column 32, line 56-64, After "1908" delete "Transmission media includes coaxial cables, copper wire and fiber optics, including the wires that comprise the bus 1906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications".

Signed and Sealed this

Thirteenth Day of September, 2011

David J. Kappos
*Director of the United States Patent and Trademark Office*